(12) United States Patent
So et al.

(10) Patent No.: US 11,586,319 B2
(45) Date of Patent: Feb. 21, 2023

(54) DISPLAY DEVICE WITH INPUT SENSOR CONFIGURED TO OPERATE IN DIFFERENT MODES

(71) Applicant: Samsung Display Co., Ltd., Yongin-si (KR)

(72) Inventors: Yongsub So, Suwon-si (KR); Yun A Ma, Asan-si (KR); Mi-Hee Son, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/206,603

(22) Filed: Mar. 19, 2021

(65) Prior Publication Data

US 2022/0019327 A1 Jan. 20, 2022

(30) Foreign Application Priority Data

Jul. 14, 2020 (KR) .................... 10-2020-0087084

(51) Int. Cl.
*G06F 3/041* (2006.01)
(52) U.S. Cl.
CPC ........ *G06F 3/04162* (2019.05); *G06F 3/0412* (2013.01); *G06F 2203/04101* (2013.01)
(58) Field of Classification Search
CPC ......... G06F 2203/04101; G06F 3/0412; G06F 3/04162; G06F 2203/04108
See application file for complete search history.

(56) References Cited

U.S. PATENT DOCUMENTS

| 8,564,944 | B2 | 10/2013 | Whitt, III et al. |
| 9,817,538 | B2 | 11/2017 | Lee et al. |
| 2016/0202813 | A1* | 7/2016 | Lee ...................... G06F 3/0443 345/174 |
| 2020/0026408 | A1 | 1/2020 | Lee et al. |
| 2020/0042118 | A1* | 2/2020 | Mugiraneza ........ G06F 3/04166 |
| 2020/0133407 | A1 | 4/2020 | Kim et al. |

FOREIGN PATENT DOCUMENTS

| KR | 10-2020-0009746 A | 1/2020 |
| KR | 10-2020-0025573 A | 3/2020 |
| KR | 10-2087456 B1 | 3/2020 |
| KR | 10-2020-0050075 A | 5/2020 |

* cited by examiner

*Primary Examiner* — Lisa S Landis
(74) *Attorney, Agent, or Firm* — Lewis Roca Rothgerber Christie LLP

(57) ABSTRACT

A display device includes: a display panel configured to display an image; an input sensor on the display panel; an approach sensing electrode arranged around the input sensor; and a sensor controller connected to the input sensor and the approach sensing electrode, wherein the sensor controller is configured to drive the input sensor in a first driving mode during a first input sensing frame and to drive the input sensor in a second driving mode during a second input sensing frame, and the sensor controller is further configured to provide an uplink signal to the approach sensing electrode in response to the input sensor operating in the first or second driving mode.

19 Claims, 16 Drawing Sheets

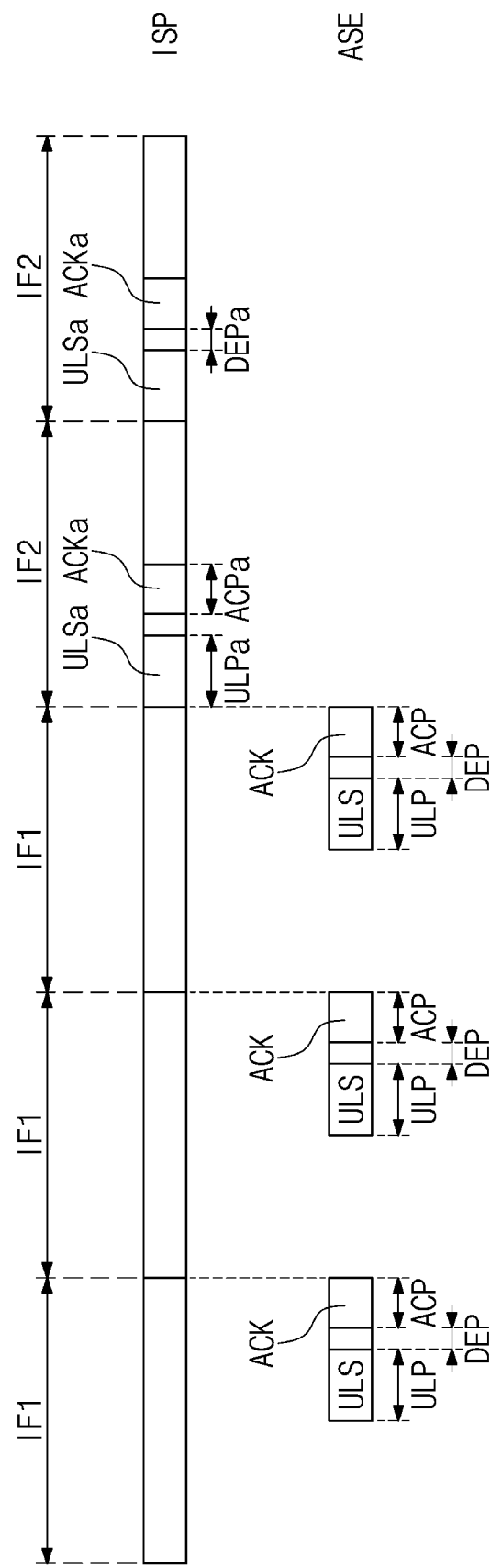

DISPLAY DEVICE WITH INPUT SENSOR CONFIGURED TO OPERATE IN DIFFERENT MODES

CROSS-REFERENCE TO RELATED APPLICATION

The present application claims priority to and the benefit of Korean Patent Application No. 10-2020-0087084, filed on Jul. 14, 2020, the entire content of which is hereby incorporated by reference.

BACKGROUND

Aspects of some embodiments of the present disclosure herein relates to a display device.

Multimedia electronic devices such as a television, a mobile phone, a tablet computer, a navigation device, and a game machine each have a display device for displaying an image. Electronic devices may each include an input sensor capable of providing a touch-based input method that enables a user to easily input information or commands in an intuitive and convenient manner, in addition to typical input methods using, for example, a button, a keyboard, and a mouse.

The input sensor may sense a touch or pressure provided by using a user's body. Meanwhile, there is an increasing demand for an electronic pen for detailed touch input for a user who is familiar with information input using a writing instrument or for a specific application program (e.g., an application program for sketching or drawing).

Accordingly, an input sensor employed in an electronic device is required to sense a variety of inputs such as an electronic pen input as well as an input by a touch or pressure provided by a user's body.

The above information disclosed in this Background section is only for enhancement of understanding of the background and therefore the information discussed in this Background section does not necessarily constitute prior art.

SUMMARY

Aspects of some embodiments of the present disclosure herein relate to a display device, and for example, to a display device with improved input sensing performance.

Aspects of some embodiments of the present disclosure include a display device capable of preventing or reducing degradation of input sensing performance when the display device is driven at a relatively high speed.

According to some embodiments of the inventive concept, a display device includes a display panel configured to display an image, an input sensor on the display panel, an approach sensing electrode arranged around the input sensor, and a sensor controller connected to the input sensor and the approach sensing electrode.

According to some embodiments, the sensor controller may drive the input sensor in a first driving mode during a first input sensing frame and drive the input sensor in a second driving mode during a second input sensing frame. The sensor controller may provide, while the input sensor operates in the first or second driving mode, an uplink signal to the approach sensing electrode.

According to some embodiments, a display device includes a display panel configured to display an image, an input sensor on the display panel, a window on the input sensor, an approach sensing electrode on a rear surface of the window, and a sensor controller connected to the input sensor and the approach sensing electrode. The sensor controller may drive the input sensor in a first driving mode during a first input sensing frame and drive the input sensor in a second driving mode during a second input sensing frame. The sensor controller may provide, while the input sensor operates in the first or second driving mode, an uplink signal to the approach sensing electrode.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to describe principles of the inventive concept. In the drawings:

FIG. 8C is a conceptual diagram illustrating operations over time of an input sensor and an approach sensing electrode according to some embodiments of the inventive concept.

DETAILED DESCRIPTION

Figure 1A:
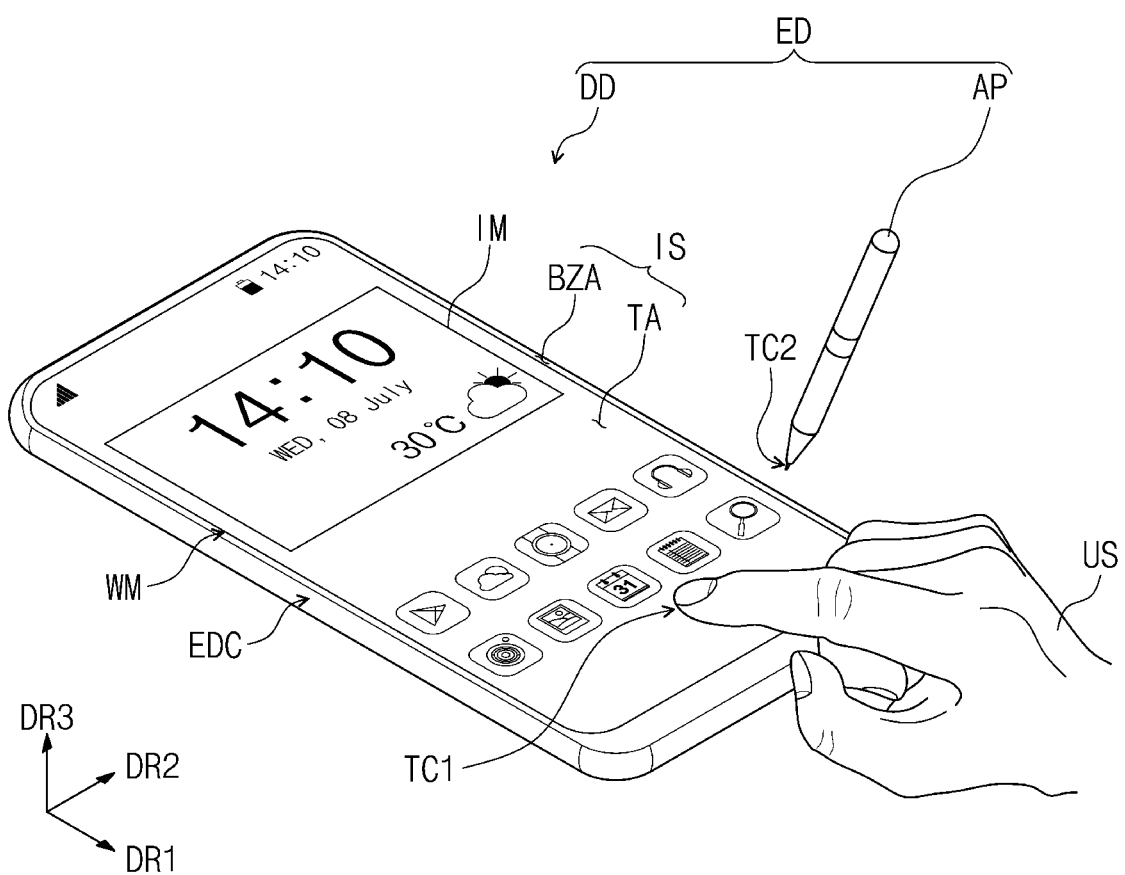
FIG. 1A is a perspective view of a display device according to some embodiments of the inventive concept.

It will be understood that when an element or layer is referred to as being "on", "connected to" or "coupled to"

another element or layer, it can be directly on, connected or coupled to the other element or layer, or intervening elements or layers may be present.

Like reference numerals refer to like elements throughout this specification. In the figures, the thicknesses, ratios and dimensions of elements are exaggerated for effective description of the technical contents.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. As used herein, the singular forms, "a", "an" and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "include" or "have", when used in this specification, specify the presence of stated features, integers, steps, operations, elements, and/or components, but do not preclude the presence or addition of one or more other features, integers, steps, operations, elements, components, and/or groups thereof.

Hereinafter, aspects of some embodiments the present invention will be explained in more detail with reference to the accompanying drawings.

Figure 1B:
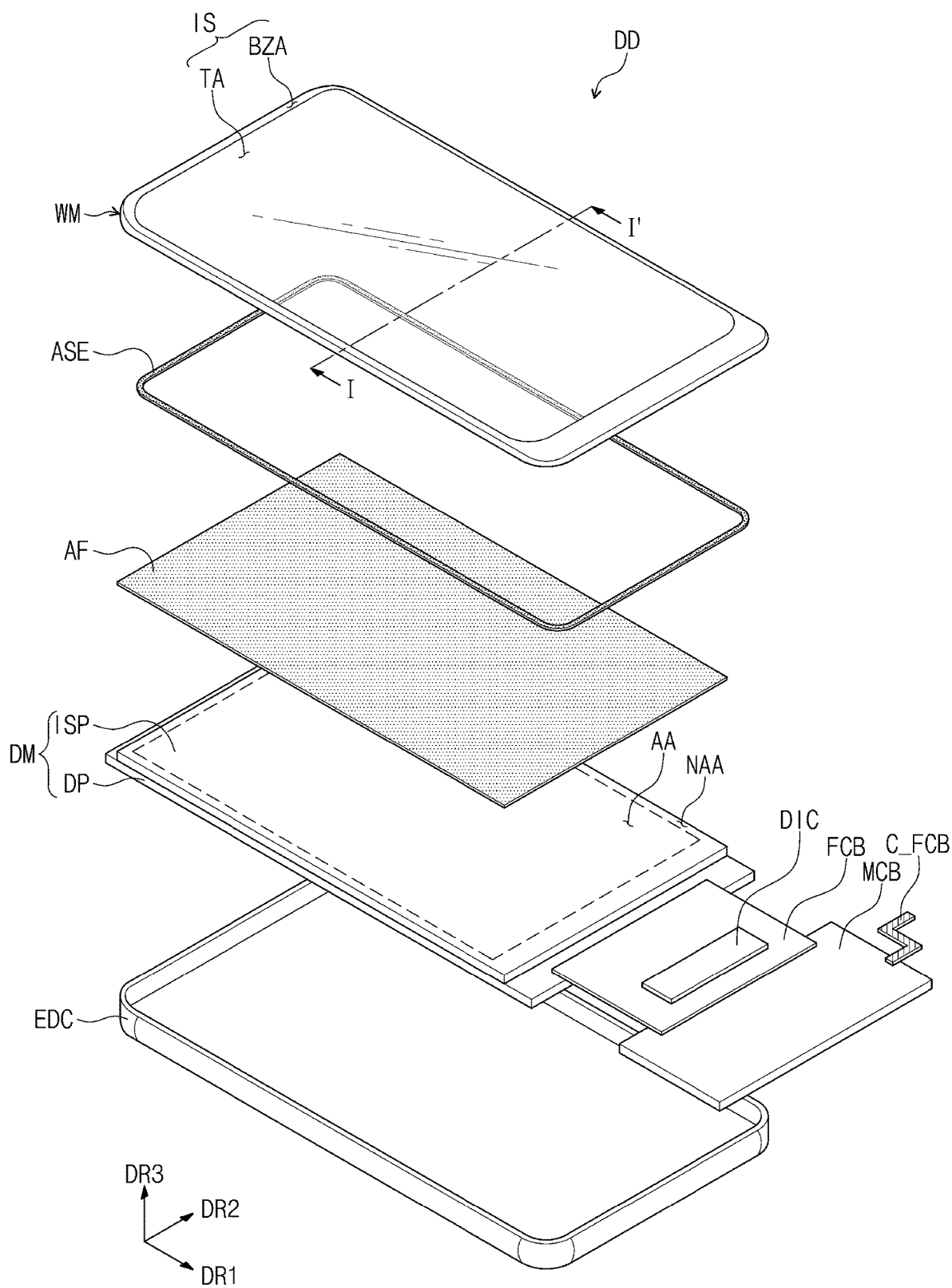
FIG. 1B is an exploded perspective view of a display device according to some embodiments of the inventive concept.
Figure 1C:
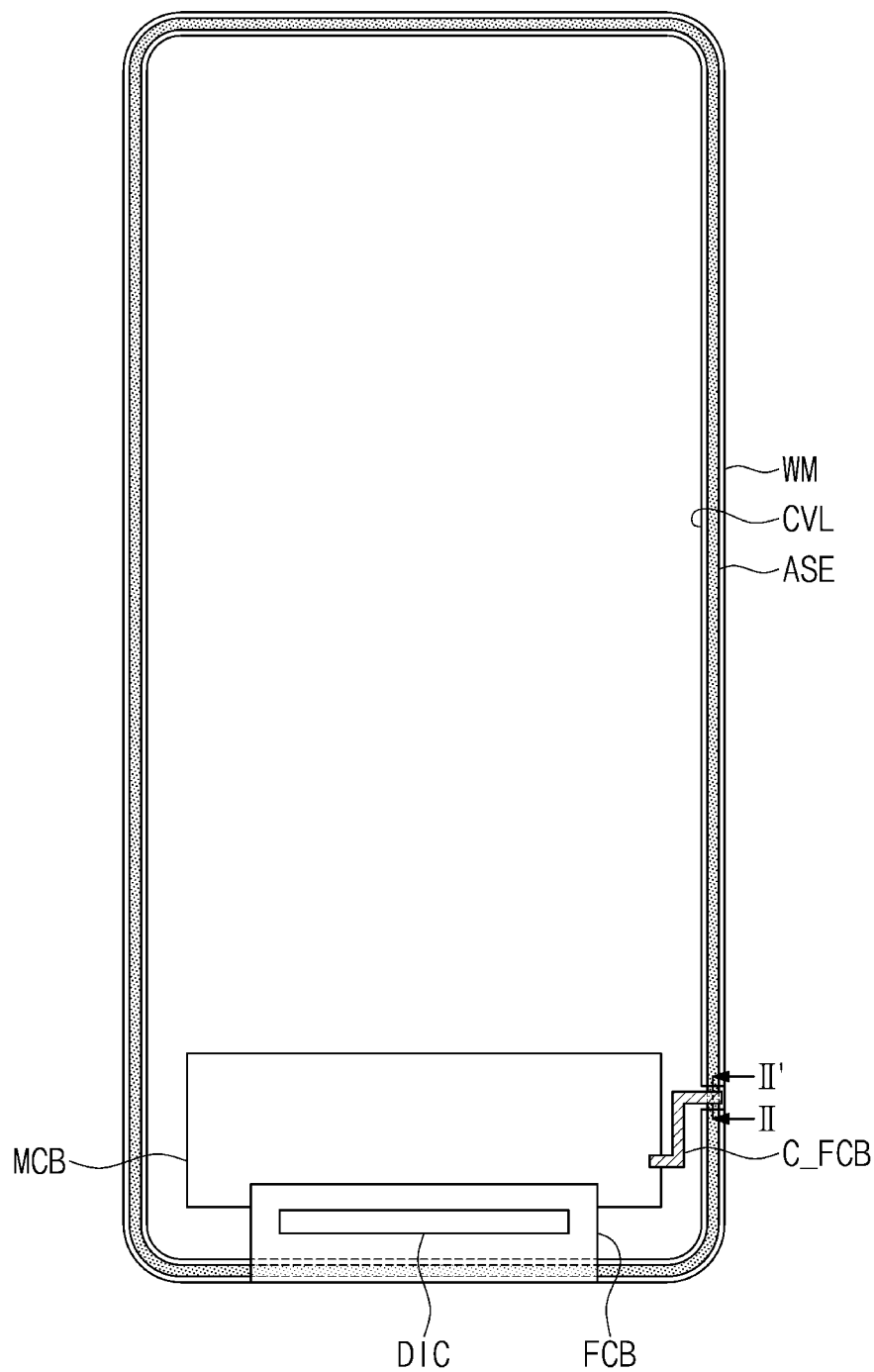
FIG. 1C is a rear view of a display device according to some embodiments of the inventive concept.
Figure 1D:
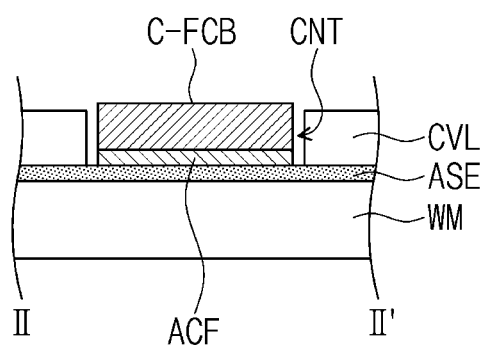
FIG. 1D is a cross-sectional view of a display device taken along the line II-II' illustrated in FIG. 1C.
Figure 2A:
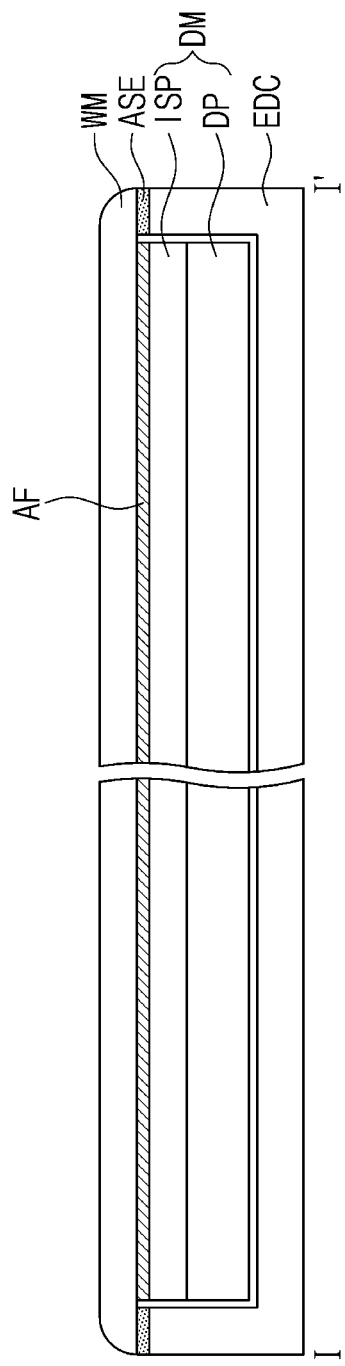
FIG. 2A is a cross-sectional view of a display device taken along the line I-I' illustrated in FIG. 1B.
Figure 2B:
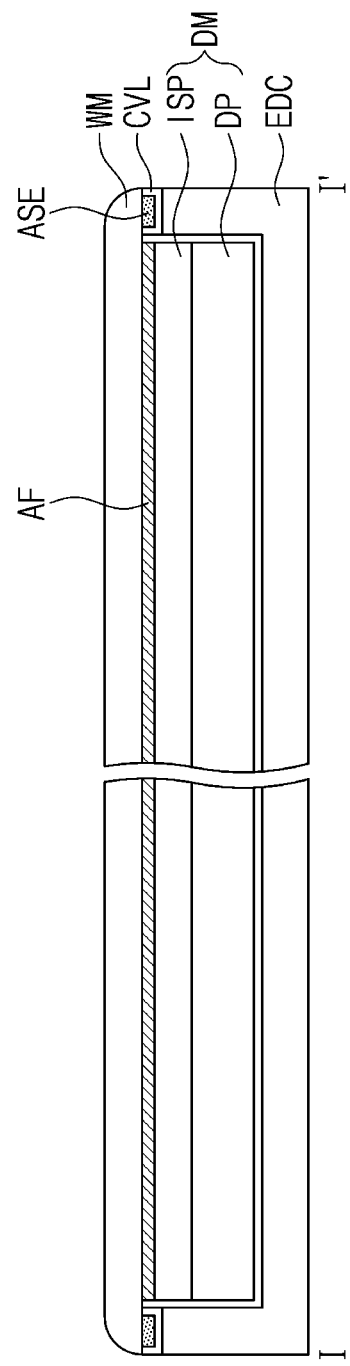
FIGS. 2B and 2C are each a cross-sectional view of a display device according to some embodiments of the inventive concept.
Figure 2C:
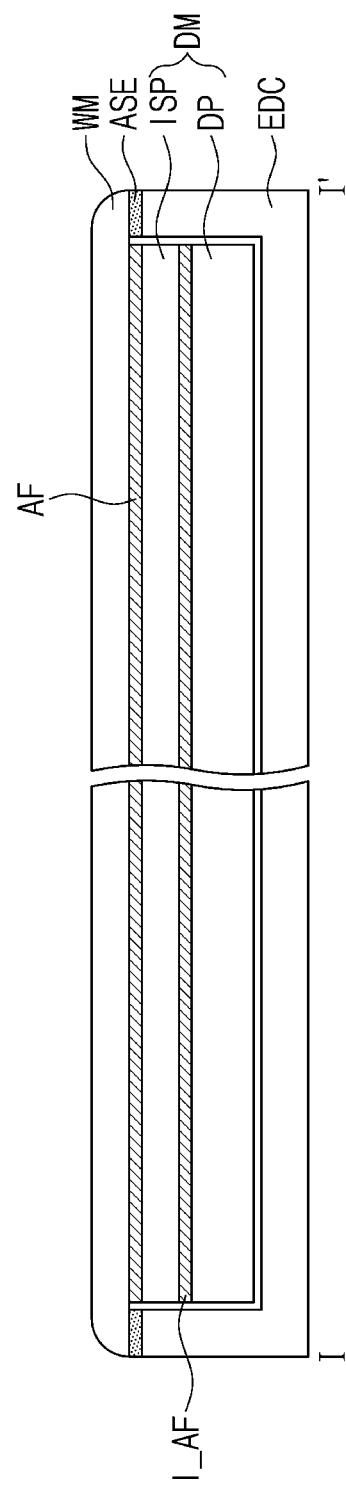

FIG. 1A is a perspective view of a display device according to some embodiments of the inventive concept, and FIG. 1B is an exploded perspective view of a display device according to some embodiments of the inventive concept. FIG. 1C is a rear view of a display device according to some embodiments of the inventive concept. FIG. 1D is a cross-sectional view of a display device taken along the line II-II' illustrated in FIG. 1C. FIG. 2A is a cross-sectional view of a display device taken along the line I-I' illustrated in FIG. 1B. FIGS. 2B and 2C are each a cross-sectional view of a display device according to some embodiments of the inventive concept.

Referring to FIGS. 1A to 1C, an electronic device ED may be a device that is activated according to an electrical signal. The electronic device ED may include various embodiments or applications. For example, the electronic device ED may be applied to electronic devices such as a smart watch, a tablet, a laptop computer, a computer, and a smart television.

The electronic device ED may include a display device DD and an input device AP. The display device DD may display an image IM toward a third direction DR3 on a display surface IS that is parallel to a plane defined by a first direction DR1 and a second direction DR2. The display surface IS on which the image IM is displayed may correspond to a front surface of the display device DD. The image IM may include a moving image or a still image.

According to some embodiments, a front surface (or a top surface) and a rear surface (or a bottom surface) of each of members are defined in relation to the third direction DR3 in which the image IM is displayed. The front surface and the rear surface may be opposing each other in the third direction DR3, and a normal direction of each of the front surface and the rear surface may be parallel to the third direction DR3.

A separation distance between the front surface and a rear surface in the third direction DR3 of the display device DD may correspond to the thickness in the third direction DR3 of the display device DD. Meanwhile, the directions indicated by the first to third directions DR1 to DR3 are relative and may be converted into different directions.

The display device DD may sense an external input applied from the outside. The external input may include various types of inputs provided from outside of the display device DD. The display device DD according to some embodiments of the inventive concept may sense a first input TC1 of a user US applied from the outside. The first input TC1 of the user US may be any one or a combination of various types of external inputs such as a part of a user's body, light, heat, and pressure. Although, according to some embodiments, the first input TC1 of the user US is described, as an example, as a touch input by the hand of the user US applied to the front surface, this is an example, and the first input TC1 of the user US may be provided in various types as described above. In addition, the display device DD may sense, according to the structure thereof, a first input TC1 of the user US that is applied to a side surface or the rear surface of the display device DD, and the display device DD is not limited to any one embodiment.

In addition, the display device DD according to some embodiments of the inventive concept may sense a second input TC2 applied from the outside. The second input TC2 may include inputs by the input device AP (e.g., a stylus pen, an active pen, a touch pen, an electronic pen, an e-pen, etc.) other than the hand of the user US. In the following description, the second input TC2 is described, as an example, as an input by the active pen.

The front surface of the display device DD may be divided into a transmissive area TA and a bezel area BZA. The transmissive area TA may be an area in which the image IM is displayed. The user US views the image IM through the transmissive area TA. According to some embodiments, the transmissive area TA is illustrated as a quadrangular shape having round vertices. However, this is illustrated by way of example, and the transmissive area TA may have various shapes and is not limited to any one embodiment.

The bezel area BZA is adjacent to the transmissive area TA. The bezel area BZA may have a color (e.g., a set or predetermined color). The bezel area BZA may surround the transmissive area TA. Accordingly, the shape of the transmissive area TA may be substantially defined by the bezel area BZA. However, this is illustrated by way of example, and the bezel area BZA may be located adjacent to only one side of the transmissive area TA or may be omitted. The display device DD according to some embodiments of the inventive concept may include various embodiments and is not limited to any one embodiment.

As illustrated in FIG. 1B, the display device DD may include a display module DM and a window WM located on the display module DM. The display module DM may include a display panel DP and an input sensor ISP.

The display panel DP according to some embodiments of the inventive concept may be a light emitting display panel and is not particularly limited. For example, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot, a quantum rod, and the like. Hereinafter, the display panel DP is described as the organic light emitting display panel.

FIGS. 1A and 1B illustrate the display device DD with a flat structure, but embodiments according to the inventive concept are not limited thereto. The display device DD may be bent or folded about a folding axis or may have a slidable structure.

Referring to FIGS. 2A and 2B, the input sensor ISP may be arranged directly on the display panel DP. According to some embodiments of the inventive concept, the input sensor ISP may be formed on the display panel DP by a continuous process. That is, when the input sensor ISP is arranged directly on the display panel DP, an adhesive film is not located between the input sensor ISP and the display panel DP. As illustrated in FIG. 2C, however, an internal adhesive film I_AF may be located between an input sensor ISP and a display panel DP. In this case, the input sensor ISP may not be manufactured by a continuous process together with the display panel DP. The input sensor ISP may be manufactured through a process separate from a process of the display panel DP and then may be fixed to a top surface of the display panel DP by the internal adhesive film I_AF.

The display panel DP outputs the image IM, and the input sensor ISP acquires coordinate information of an external input (e.g., the first and second inputs TC1 and TC2).

The window WM may be made of a transparent material capable of transmitting the image IM. For example, the window WM may be made of glass, sapphire, plastic, or the like. Although illustrated as being of a single layer, the window WM is not limited thereto and may include a plurality of layers.

Referring to FIGS. 1B to 1D, the display device DD may further include an approach sensing electrode ASE located on a rear surface of the window WM. According to some embodiments of the inventive concept, the approach sensing electrode ASE may be provided to the window WM in correspondence with the bezel area BZA of the display device DD. The approach sensing electrode ASE may not overlap the transmissive area TA.

The approach sensing electrode ASE may include a metallic material. The approach sensing electrode ASE may be provided in a manner in which the approach sensing electrode ASE is formed directly on the rear surface of the window WM in a coating method without a separate adhesive member, or in a manner in which the approach sensing electrode ASE is attached to the rear surface of the window WM by a separate adhesive member.

According to some embodiments of the inventive concept, the approach sensing electrode ASE may have a closed loop shape. However, the shape of the approach sensing electrode ASE is not limited thereto. For example, the display device DD may include two or more approach sensing electrodes ASE arranged to be spaced apart from each other.

As illustrated in FIG. 2B, the display device DD may further include a cover layer CVL covering the approach sensing electrode ASE. The cover layer CVL may include an insulating material. The cover layer CVL may protect the approach sensing electrode ASE from moisture, oxygen, or foreign matter. The cover layer CVL may have a single layer structure or a multilayer structure in which a plurality of layers are laminated.

According to some embodiments of the inventive concept, the cover layer CVL may include a material having a color (e.g., a set or predetermined color). For example, the cover layer CVL may be a black organic film. Accordingly, the cover layer CVL may perform a function of blocking leakage of light outputted from the display module DM. Here, the cover layer CVL is described as having a light blocking function, but embodiments according to the present disclosure are not limited thereto. That is, a light blocking layer formed of a layer separate from the cover layer CVL may be provided on the rear surface of the window WM. In this case, the light blocking layer may be located between the approach sensing electrode ASE and the window WM or may be located on the cover layer CVL.

The window WM may be bonded to the display module DM by an adhesive film AF. According to some embodiments of the inventive concept, the adhesive film AF may include an optically clear adhesive (OCA) film. However, the adhesive film AF is not limited thereto and may include a typical adhesive or a typical detachable adhesive. For example, the adhesive film AF may include an optically clear resin (OCR) or a pressure sensitive adhesive (PSA) film.

An anti-reflection layer may be further located between the window WM and the display module DM. The anti-reflection layer reduces the degree of reflection of external light incident from above the window WM. The anti-reflection layer according to some embodiments of the inventive concept may include a phase retarder and a polarizer. The phase retarder may be of a film type or a liquid crystal coating type and may include a A/2 phase retarder and/or a A/4 phase retarder. The polarizer may also be of the film type or the liquid crystal coating type. The film type may include a stretched synthetic resin film, and the liquid crystal coating type may include liquid crystals (e.g., aligned in a set or predetermined alignment). The phase retarder and the polarizer may be implemented as one polarizing film.

The display module DM may display an image according to an electrical signal and transmit/receive information about an external input. The display module DM may be defined as including an active area AA and a peripheral area NAA. The active area AA may be defined as an area that emits an image provided by the display module DM.

The peripheral area NAA is adjacent to the active area AA. For example, the peripheral area NAA may surround the active area AA. However, this is illustrated as an example, and the peripheral area NAA may be defined in various shapes and embodiments according to the present disclosure are not limited to the peripheral area NAA having any particular shape. According to some embodiments, the active area AA of the display module DM may correspond to at least a portion of the transmissive area TA.

The display device DD may further include a main circuit board MCB, a flexible circuit film FCB, and a driving chip DIC. The main circuit board MCB may be connected to the flexible circuit film FCB to be electrically connected to the display panel DP. The main circuit board MCB may include a plurality of driving elements. The plurality of driving elements may include a circuit unit for driving the display panel DP. The flexible circuit film FCB is connected to the display panel DP to electrically connect the display panel DP and the main circuit board MCB. The driving chip DIC may be mounted on the flexible circuit film FCB.

The driving chip DIC may include driving elements to drive pixels of the display panel DP, for example, a data driving circuit. Although the flexible circuit film FCB according to some embodiments of the inventive concept is illustrated as a single flexible circuit film, the flexible circuit film FCB is not limited thereto and may be provided in plurality to be connected to the display panel DP. FIG. 1B illustrates a configuration in which the driving chip DIC is mounted on the flexible circuit film FCB, but embodiments according to the inventive concept are not limited thereto. For example, the driving chip DIC may be mounted directly on the display panel DP. In this case, a portion of the display panel DP on which the driving chip DIC is mounted may be bent and located on a rear surface of the display module DM.

The input sensor ISP may be electrically connected to the main circuit board MCB through the flexible circuit film FCB. However, embodiments according to the inventive concept are not limited thereto. That is, the display module DM may additionally include a separate flexible circuit film for electrically connecting the input sensor ISP to the main circuit board MCB.

The display device DD further includes a contact flexible circuit film C_FCB that connects the main circuit board MCB and the approach sensing electrode ASE. The contact flexible circuit film C_FCB is located on a rear surface of the display module DM. The approach sensing electrode ASE may be electrically connected to the main circuit board MCB through the contact flexible circuit film C_FCB on the rear surface of the display module DM. The main circuit board MCB may provide an uplink signal to the approach sensing electrode ASE through the contact flexible circuit film C_FCB. The uplink signal may include a beacon signal. The beacon signal may be a high voltage signal. For example, the beacon signal may be a high frequency signal swinging between about 0 V and about 14.5 V. The main circuit board MCB may sense the approach of the input device AP by periodically transmitting, through the approach sensing electrode ASE, the beacon signal negotiated with the input device AP. The uplink signal may further include panel information about the display device DD, a synchronization signal, and the like.

The approach sensing electrode ASE may overlap the peripheral area NAA of the display module DM and may not overlap the active area AA of the display module DM. Accordingly, it may be possible to prevent the image IM outputted from the active area AA from being blocked by the approach sensing electrode ASE. In addition, even when the approach sensing electrode ASE transmits the uplink signal, which is a high voltage signal, to the input device AP, a phenomenon that a flicker is viewed on the display module DM due to the uplink signal may be prevented or alleviated.

Referring to FIGS. 1C and 1D, a contact portion CNT for exposing the approach sensing electrode ASE may be provided in the cover layer CVL. The contact portion CNT may be formed by partially removing the cover layer CVL. In the contact portion CNT, the contact flexible circuit film C_FCB is arranged to overlap the approach sensing electrode ASE. An anisotropic conductive film ACF may be located between the contact flexible circuit film C_FCB and the approach sensing electrode ASE. The contact flexible circuit film C_FCB and the approach sensing electrode ASE are electrically connected by the anisotropic conductive film ACF. Accordingly, the uplink signal provided through the contact flexible circuit film C_FCB may be transmitted to the approach sensing electrode ASE through the anisotropic conductive film ACF. In addition, because the anisotropic conductive film ACF includes an adhesive material, the contact flexible circuit film C_FCB may be bonded to the approach sensing electrode ASE by the anisotropic conductive film ACF.

As another example, the main circuit board MCB may be directly connected to the approach sensing electrode ASE without passing through the contact flexible circuit film C_FCB. In this case, the main circuit board MCB may extend to overlap the approach sensing electrode ASE and may be electrically connected to the approach sensing electrode ASE by the anisotropic conductive film ACF or the like.

In addition, the display device DD may further include a connector or the like for electrically connecting the main circuit board MCB and the contact flexible circuit film C_FCB.

FIG. 1C illustrates a structure in which the approach sensing electrode ASE is in contact with the contact flexible circuit film C_FCB at one point. However, embodiments according to the inventive concept are not limited thereto. The approach sensing electrode ASE may get in contact with the contact flexible circuit film C_FCB at two points. In this case, the display device DD may include two contact flexible circuit films C_FCB that get in contact with the approach sensing electrode ASE at the two points, respectively. When the size of the display device DD increases, the intensity of the uplink signal may vary depending on a position at the approach sensing electrode ASE. That is, as the distance from the point increases where the approach sensing electrode ASE is in contact with the contact flexible circuit film C_FCB, the intensity of the uplink signal may decrease. Accordingly, when the display device DD becomes bigger, a phenomenon that the intensity of the uplink signal applied to the approach sensing electrode ASE varies depending on the position at the approach sensing electrode ASE may be prevented by increasing the number of points where the approach sensing electrode ASE gets in contact with contact flexible circuit films C_FCB.

Referring back to FIG. 1B, the display device DD further includes an outer case EDC that accommodates the display module DM. The outer case EDC may combine with the window WM to define the appearance of the display device DD. The outer case EDC absorbs impacts applied from the outside and prevents foreign matter/moisture or the like from permeating the display module DM, thereby protecting the elements accommodated in the outer case EDC. According to some embodiments of the inventive concept, on the other hand, the outer case EDC may be provided in a form in which a plurality of storage members are combined.

The display device DD according to some embodiments may further include an electronic module including various functional modules for operating the display module DM, a power supply module supplying power necessary for the overall operation of the display device DD, a bracket combined with the display module DM and/or the outer case EDC to divide an internal space of the display device DD, and the like.

Figure 3A:
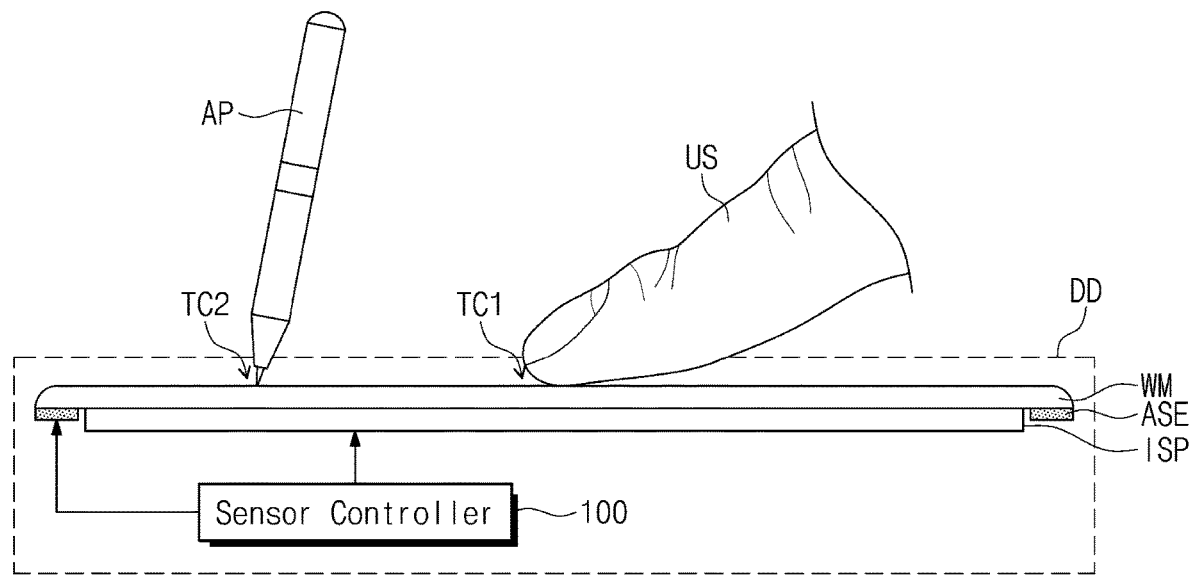
FIG. 3A is a block diagram for describing an operation of an electronic device according to some embodiments of the inventive concept.
Figure 3B:
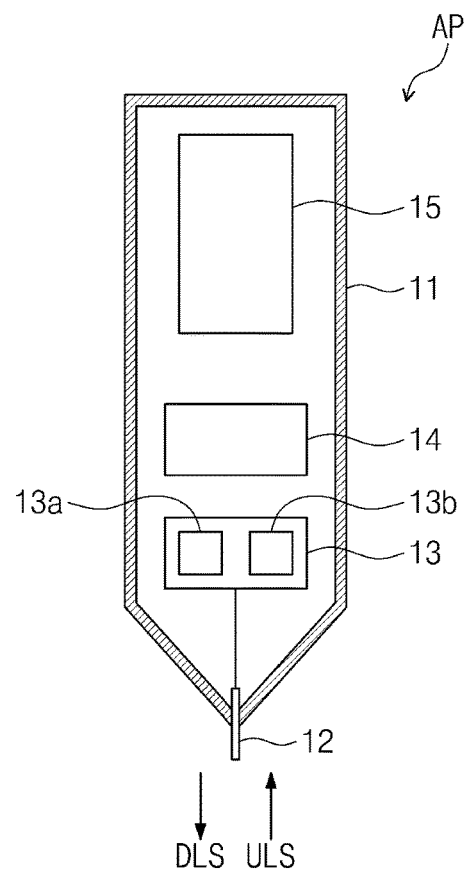
FIG. 3B is a block diagram of the input device illustrated in FIG. 3A.

FIG. 3A is a block diagram for describing an operation of an electronic device according to some embodiments of the inventive concept, and FIG. 3B is a block diagram of the input device illustrated in FIG. 3A.

Referring to FIG. 3A, the display device DD according to some embodiments of the inventive concept further includes a sensor controller 100 connected to the input sensor ISP and the approach sensing electrode ASE. The sensor controller 100 may control driving of the input sensor ISP and the approach sensing electrode ASE. According to some embodiments of the inventive concept, the sensor controller 100 may be mounted on the main circuit board MCB (illustrated in FIG. 1B). However, embodiments of the inventive concept are not limited thereto. That is, the sensor controller 100 may be embedded in the driving chip DIC (illustrated in FIG. 1B).

The input sensor ISP may include sensing electrodes. The structure and operation of the input sensor ISP will be described in detail later with reference to FIGS. 4 to 7B.

The sensor controller 100 may be connected to the sensing electrodes of the input sensor ISP. The sensor controller 100 may operate the input sensor ISP in a first driving mode to sense the first input TC1 and operate the input sensor ISP in a second driving mode to sense the second input TC2.

As illustrated in FIGS. 3A and 3B, the input device AP may include a housing 11, a conductive tip 12, and a communication module 13. The housing 11 may have a pen shape and include an accommodation space formed therein. The conductive tip 12 may protrude outwards from one side, which has an opening, of the housing 11. The conductive tip 12 may be a part of the input device AP that directly contacts the input sensor ISP.

The communication module 13 may include a transmitting circuit 13a and a receiving circuit 13b. The transmitting circuit 13a may transmit a downlink signal DLS to the sensor controller 100. The downlink signal DLS may include pen data, position information of the input device AP, slope of the input device AP, state information, and the like. When the input device AP contacts the input sensor ISP, the sensor controller 100 may receive the downlink signal DLS through the input sensor ISP.

The receiving circuit 13b may receive an uplink signal ULS from the sensor controller 100. The uplink signal ULS may include information such as the beacon signal, the panel information, and protocol version. The sensor controller 100 provides the uplink signal ULS to the approach sensing electrode ASE to sense the approach of the input device AP. When the input device AP is close to the display device DD, the input device AP may receive the uplink signal ULS from the approach sensing electrode ASE.

The input device AP further includes an input controller 14 that controls driving of the input device AP. The input controller 14 may be configured to operate according to a prescribed program. The transmitting circuit 13a receives a signal provided from the input controller 14 to convert the received signal into a signal that may be sensed by the input sensor ISP, and the receiving circuit 13b converts a signal received from the approach sensing electrode ASE into a signal that may be processed by the input controller 14.

The input device AP may further include a power module 15 for supplying power to the input device AP.

Figure 4:
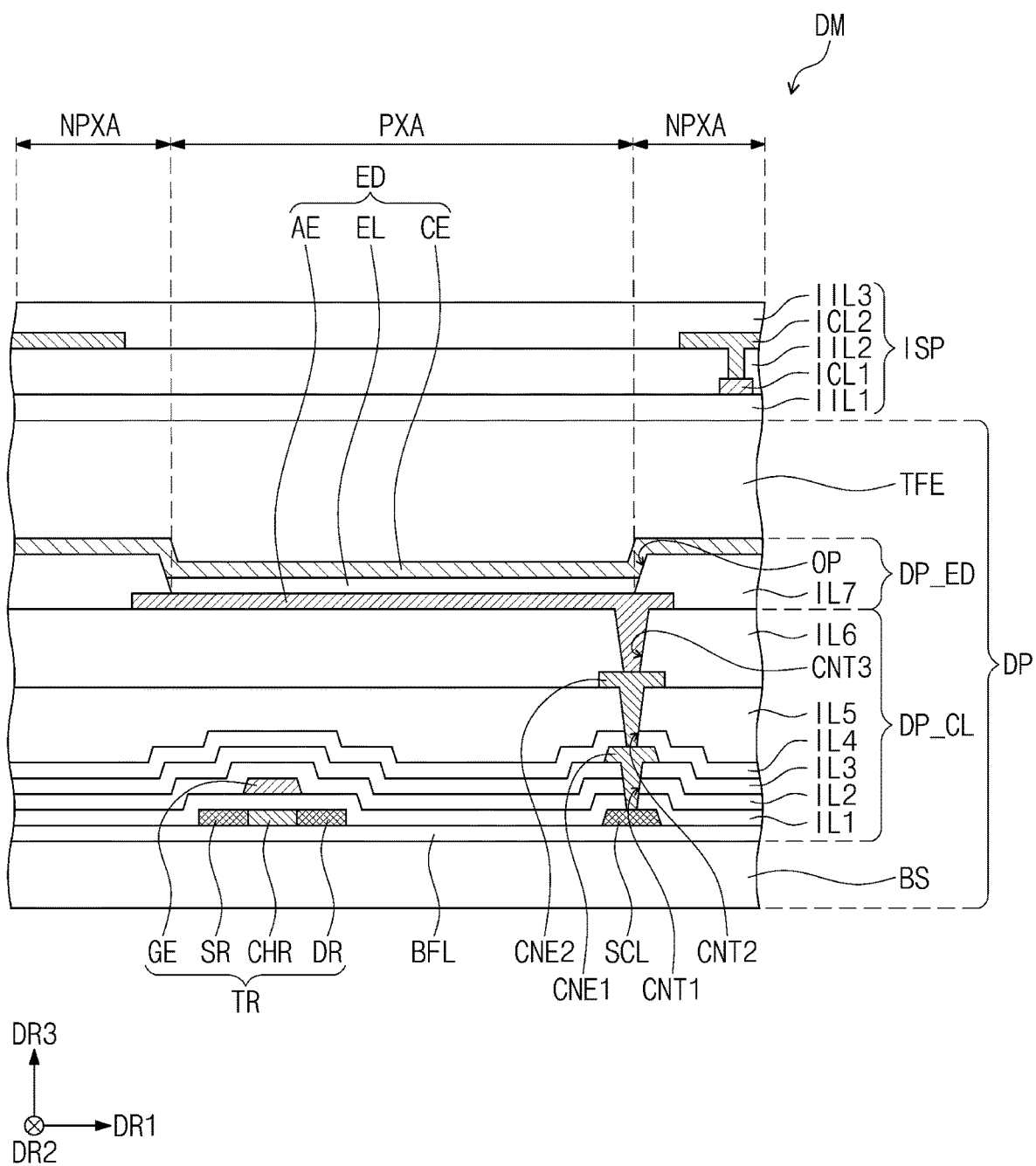
FIG. 4 is a cross-sectional view of a display module according to some embodiments of the inventive concept.

FIG. 4 is a cross-sectional view of a display module according to some embodiments of the inventive concept.

Referring to FIG. 4, the display module DM may include the display panel DP and the input sensor ISP located directly on the display panel DP. The display panel DP may include a base layer BS, a circuit layer DP_CL, a light emitting element layer DP_ED, and an encapsulation layer TFE.

The base layer BS may provide a base surface on which the circuit layer DP_CL is located. The base layer BS may be a glass substrate, a metal substrate, a polymer substrate, or the like. However, embodiments according to the present disclosure are not limited thereto, and the base layer BS may be an inorganic layer, an organic layer, or a composite material layer.

The base layer BS may have a multilayer structure. For example, the base layer BS may have a three-layer structure of a synthetic resin layer, an adhesive layer, and a synthetic resin layer. In particular, the synthetic resin layer may include polyimide-based resin. Alternatively, the synthetic resin layer may include at least one of acrylate resin, methacrylate resin, polyisoprene resin, vinyl resin, epoxy resin, urethane resin, cellulose resin, siloxane resin, polyamide resin, or perylene resin.

The circuit layer DP_CL may be located on the base layer BS. The circuit layer DP_CL may include an insulating layer, a semiconductor pattern, a conductive pattern, a signal line, and the like. The insulating layer, a semiconductor layer, and a conductive layer may be formed on the base layer BS in a method such as coating and deposition, and thereafter, the insulating layer, the semiconductor layer, and the conductive layer may be selectively patterned through a plurality of photolithography processes. Thereafter, the semiconductor pattern, the conductive pattern, and the signal line included in the circuit layer DP_CL may be formed.

At least one inorganic layer is formed on a top surface of the base layer BS. The inorganic layer may include at least one of aluminum oxide, titanium oxide, silicon oxide, silicon oxynitride, zirconium oxide, or hafnium oxide. The inorganic layer may be formed in multiple inorganic layers. The multiple inorganic layers may constitute a barrier layer and/or a buffer layer. According to some embodiments, the display panel DP is illustrated as including a buffer layer BFL.

The buffer layer BFL may improve the bonding force between the base layer BS and the semiconductor pattern. The buffer layer BFL may include a silicon oxide layer and a silicon nitride layer, and the silicon oxide layer and the silicon nitride layer may be alternately laminated.

The semiconductor pattern may be located on the buffer layer BFL. The semiconductor pattern may include polysilicon. However, the semiconductor pattern is not limited thereto and may include amorphous silicon or metal oxide.

FIG. 4 illustrates only a portion of the semiconductor pattern, and another portion of the semiconductor pattern may be further located in another area. The semiconductor pattern may be arranged in a specific rule across the pixels. The semiconductor pattern may have different electrical properties depending on whether the same is doped. The semiconductor pattern may include a doped region and a non-doped region. The doped region may be doped with an N-type dopant or a P-type dopant. A PMOS transistor may include a doped region doped with a P-type dopant, and an NMOS transistor may include a doped region doped with an N-type dopant.

The doped region may have a higher conductivity than the non-doped region and may substantially serve as an electrode or a signal line. The non-doped region may substantially correspond to an active region (or a channel region) of a transistor. In other words, one portion of the semiconductor pattern may be the active region of the transistor, and another portion thereof may be a source region or a drain region of the transistor.

Each of the pixels may have an equivalent circuit including seven transistors, one capacitor, and a light emitting element, and an equivalent circuit diagram of the pixel may be variously modified. In FIG. 4, one transistor TR and a light emitting element ED included in the pixel are illustrated by way of example.

A source region SR, an active region CHR, and a drain region DR of the transistor TR may be formed from the semiconductor pattern. The source region SR and the drain region DR may be provided in opposite directions from the active region CHR when viewed on a cross section. FIG. 4 illustrates a portion of a signal line SCL located in the same layer as the semiconductor pattern. According to some embodiments, the signal line SCL may be electrically connected to the transistor TR when viewed in a plane.

A first insulating layer IL1 may be located on the buffer layer BFL. The first insulating layer IL1 may overlap the plurality of pixels in common and cover the semiconductor pattern. The first insulating layer IL1 may be an inorganic layer and/or an organic layer and may have a single layer structure or a multilayer structure. The first insulating layer IL1 may include at least one of aluminum oxide, titanium oxide, silicon oxide, silicon oxynitride, zirconium oxide, or hafnium oxide. According to some embodiments, the first insulating layer IL1 may be a single-layer silicon oxide layer. Not only the first insulating layer IL1 but also an insulating layer of the circuit layer DP_CL to be described later may be an inorganic layer and/or an organic layer and may have a single layer structure or a multilayer structure. The inorganic layer may include at least one of the above-described materials but embodiments according to the present disclosure are not limited thereto.

A gate GE of the transistor TR is located on the first insulating layer IL1. The gate GE may be a portion of a metal pattern. The gate GE overlaps the active region CHR. In a process of doping the semiconductor pattern, the gate GE may function as a mask.

A second insulating layer IL2 may be located on the first insulating layer IL1 and may cover the gate GE. The second insulating layer IL2 may overlap the pixels in common. The second insulating layer IL2 may be an inorganic layer and/or an organic layer and may have a single layer structure or a multilayer structure. According to some embodiments, the second insulating layer IL2 may be a single-layer silicon oxide layer.

A third insulating layer IL3 may be located on the second insulating layer IL2, and according to some embodiments, the third insulating layer IL3 may be a single-layer silicon oxide layer.

A first connection electrode CNE1 may be located on the third insulating layer IL3. The first connection electrode CNE1 may be connected to the signal line SCL through a first contact hole CNT1 penetrating the first, second, and third insulating layers IL1, IL2, and IL3.

A fourth insulating layer IL4 may be located on the third insulating layer IL3. The fourth insulating layer IL4 may be a single-layer silicon oxide layer. A fifth insulating layer IL5 may be located on the fourth insulating layer IL4. The fifth insulating layer IL5 may be an organic layer.

A second connection electrode CNE2 may be located on the fifth insulating layer IL5. The second connection electrode CNE2 may be connected to the first connection electrode CNE1 through a second contact hole CNT2 penetrating the fourth insulating layer IL4 and the fifth insulating layer IL5.

A sixth insulating layer IL6 may be located on the fifth insulating layer IL5 and may cover the second connection electrode CNE2. The sixth insulating layer IL6 may be an organic layer. The light emitting element layer DP_ED may be located on the circuit layer DP_CL. The light emitting element layer DP_ED may include the light emitting element ED. For example, the light emitting element layer DP_ED may include an organic light emitting material, a quantum dot, a quantum rod, a micro LED, or a nano LED. The light emitting element ED may include a first electrode AE, a light emitting layer EL, and a second electrode CE.

The first electrode AE may be located on the sixth insulating layer IL6. The first electrode AE may be connected to the second connection electrode CNE2 through a third contact hole CNT3 penetrating the sixth insulating layer IL6.

A pixel defining film IL7 may be located on the sixth insulating layer IL6 and may cover a portion of the first electrode AE. An opening OP is defined in the pixel defining film IL7. The opening OP of the pixel defining film IL7 exposes at least a portion of the first electrode AE. According to some embodiments, a light emitting area PXA is defined to correspond to the portion of the first electrode AE exposed by the opening OP. A non-light emitting area NPXA may surround the light emitting area PXA.

The light emitting layer EL may be located on the first electrode AE. The light emitting layer EL may be located in the opening OP. That is, the light emitting layer EL may be formed separately in each of the pixels. The light emitting layer EL may be provided in plurality. When the light emitting layer EL is formed separately in each of the pixels, each of the light emitting layers EL may emit light of at least one color of blue, red, or green. However, the light emitting layer EL is not limited thereto and may be connected to pixels and provided in common. In this case, the light emitting layer EL may provide blue light or white light.

The second electrode CE may be located on the light emitting layer EL. The second electrode CE may have an integral shape and may be located in common in the plurality of pixels. A common voltage may be provided to the second electrode CE, and the second electrode CE may be referred to as a common electrode.

According to some embodiments, a hole control layer may be located between the first electrode AE and the light emitting layer EL. The hole control layer may be located in common in the light emitting area PXA and the non-light emitting area NPXA. The hole control layer may include a hole transport layer and may further include a hole injection layer. An electron control layer may be located between the light emitting layer EL and the second electrode CE. The electron control layer may include an electron transport layer and may further include an electron injection layer. The hole control layer and the electron control layer may be formed in common in the plurality of pixels by using an open mask. The encapsulation layer TFE may be located on the light emitting element layer DP_ED. The encapsulation layer TFE may include an inorganic layer, an organic layer, and an inorganic layer sequentially laminated, but layers constituting the encapsulation layer TFE are not limited thereto.

The inorganic layers may protect the light emitting element layer DP_ED from moisture and oxygen, and the organic layer may protect the light emitting element layer DP_ED from foreign matter such as dust particles. The inorganic layers may include a silicon nitride layer, a silicon oxynitride layer, a silicon oxide layer, a titanium oxide layer, an aluminum oxide layer, or the like. The organic layer may include an acrylic organic layer but is not limited thereto.

The input sensor ISP may be formed on the display panel DP through a continuous process. The input sensor ISP may include an input base layer IIL1, a first conductive layer ICL1, a sensing insulating layer IIL2, a second conductive layer ICL2, and a cover insulating layer IIL3.

The input base layer IIL1 may be an inorganic layer including any one of silicon nitride, silicon oxynitride, and silicon oxide. Alternatively, the input base layer IIL1 may be an organic layer including epoxy resin, acrylate resin, or imide-based resin. The input base layer IIL1 may have a single layer structure or a multilayer structure laminated in the third direction DR3.

Each of the first conductive layer ICL1 and the second conductive layer ICL2 may have a single layer structure or a multilayer structure laminated in the third direction DR3. A conductive layer of the single layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), and indium zinc tin oxide (IZTO). In addition, the transparent conductive layer may include a conductive polymer such as PEDOT, metal nanowires, graphene, and the like.

A conductive layer of the multilayer structure may include metal layers. The metal layers may have, for example, a three-layer structure of titanium/aluminum/titanium. The conductive layer of the multilayer structure may include at least one metal layer and at least one transparent conductive layer.

At least one of the sensing insulating layer IIL2 or the cover insulating layer IIL3 may include an inorganic film. The inorganic film may include at least one of aluminum oxide, titanium oxide, silicon oxide, silicon oxynitride, zirconium oxide, or hafnium oxide.

At least one of the sensing insulating layer IIL2 or the cover insulating layer IIL3 may include an organic film. The organic film may include at least one of acrylate resin, methacrylate resin, polyisoprene, vinyl resin, epoxy resin, urethane resin, cellulose resin, siloxane resin, polyimide resin, polyamide resin, or perylene resin.

Figure 5:
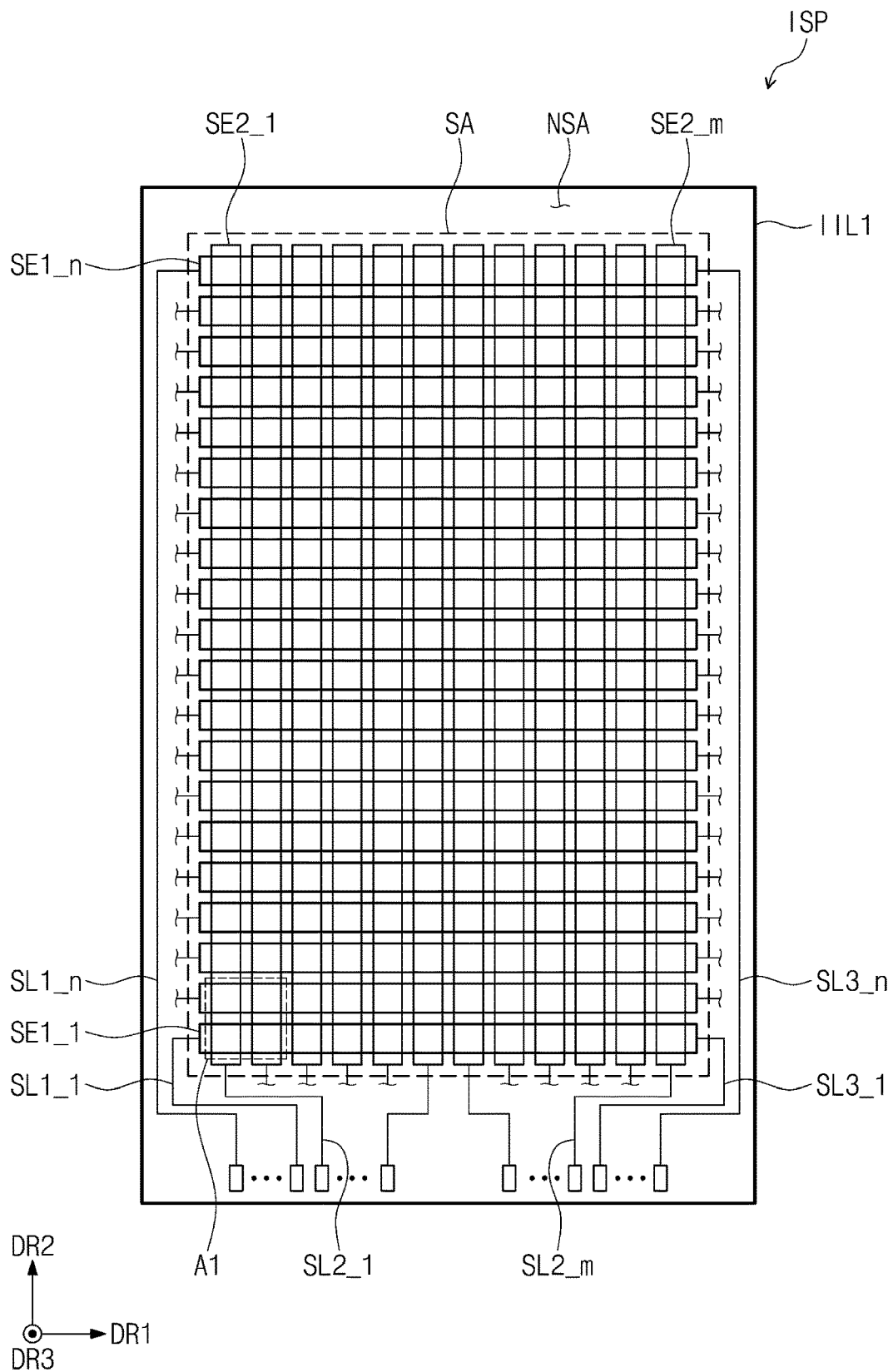
FIG. 5 is a plan view illustrating an input sensor according to some embodiments of the inventive concept.
Figure 6A:
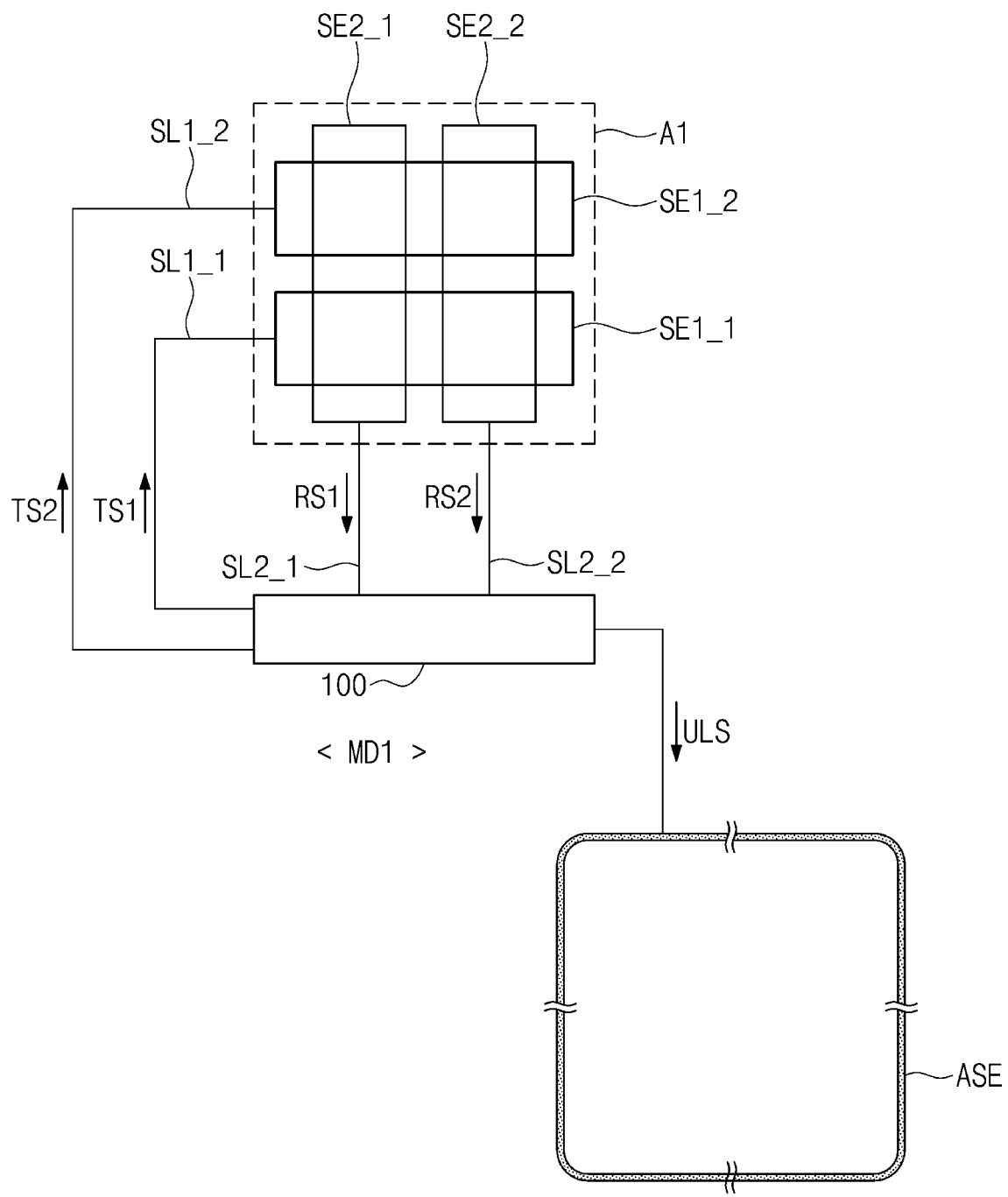
FIG. 6A is a view for describing operations of an input sensor and an approach sensing electrode in a first driving mode according to some embodiments of the inventive concept.
Figure 6B:
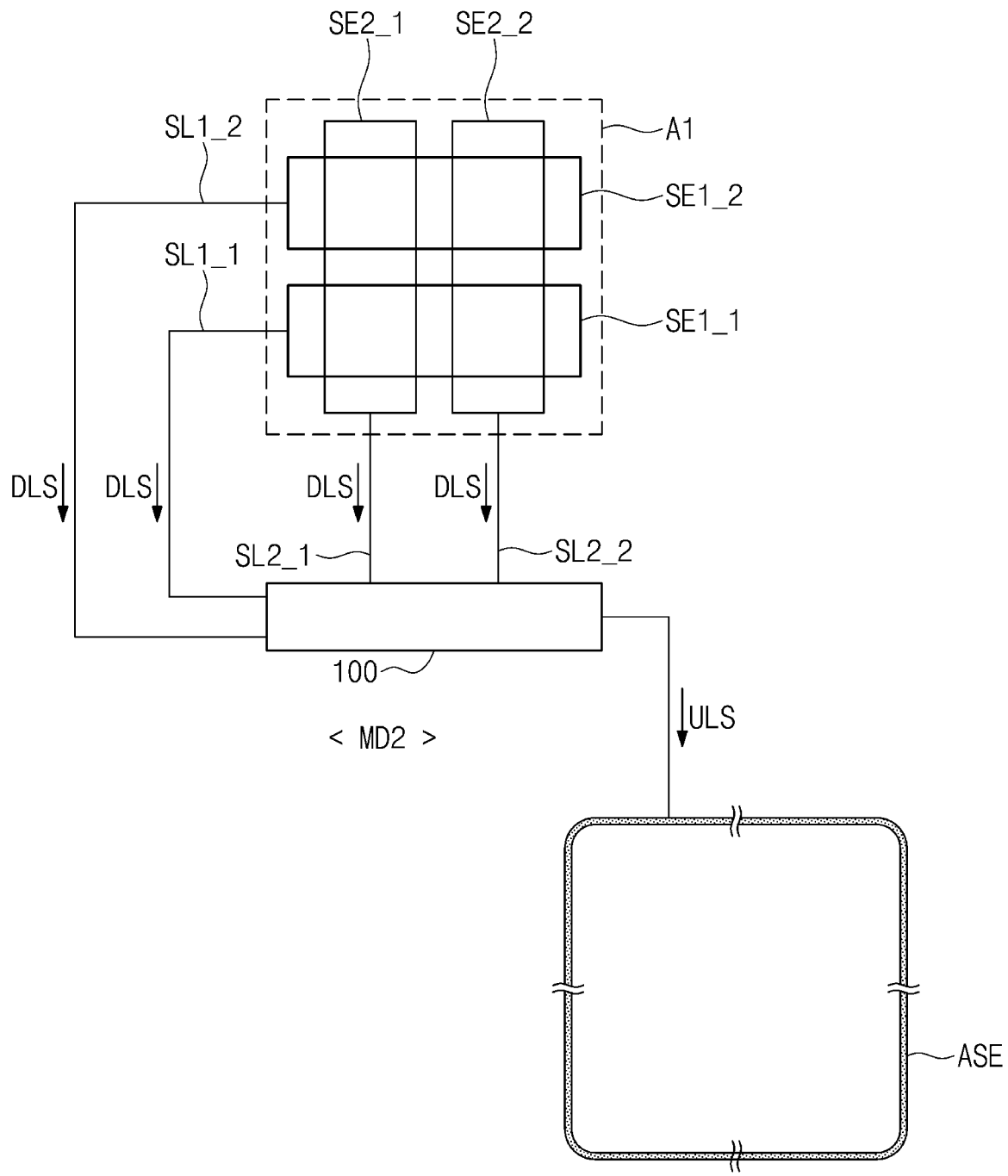
FIG. 6B is a view for describing operations of an input sensor and an approach sensing electrode in a second driving mode according to some embodiments of the inventive concept.

FIG. 5 is a plan view illustrating an input sensor according to some embodiments of the inventive concept, and FIG. 6A is a view for describing operations of an input sensor and an approach sensing electrode in a first driving mode according to some embodiments of the inventive concept. FIG. 6B is a view for describing operations of an input sensor and an approach sensing electrode in a second driving mode according to some embodiments of the inventive concept.

Referring to FIGS. 3A and 5, the input sensor ISP may include a sensing area SA and a non-sensing area NSA. The sensing area SA may be an area that is activated according to an electrical signal. For example, the sensing area SA may be an area sensing an input. The non-sensing area NSA may surround the sensing area SA.

The input sensor ISP includes first sensing electrodes SE1_1 to SE1_$n$ and second sensing electrodes SE2_1 to SE2_$m$. The first sensing electrodes SE1_1 to SE1_$n$ and the second sensing electrodes SE2_1 to SE2_$m$ cross each other in an electrically insulated manner. According to some embodiments of the inventive concept, the first sensing electrodes SE1_1 to SE1_$n$ include n number of the first sensing electrodes SE1_1 to SE1_$n$, and the second sensing electrodes SE2_1 to SE2_$m$ include m number of the second sensing electrodes SE2_1 to SE2_$m$. Here, each of n and m is a natural number of one or larger. For example, n may be a number larger than m but is not limited thereto. That is, n may be a number equal to or smaller than m.

Each of the first sensing electrodes SE1_1 to SE1_$n$ may be in a bar shape and may extend in the first direction DR1. The first sensing electrodes SE1_1 to SE1_$n$ may be arranged to be spaced apart in the second direction DR2. The first sensing electrodes SE1_1 to SE1_$n$ may have the same electrode width in the second direction DR2. A separation distance between the first sensing electrodes SE1_1 to SE1_$n$ in the second direction DR2 may be constant.

Each of the second sensing electrodes SE2_1 to SE2_$m$ may be in a bar shape and may extend in the second direction DR2. The second sensing electrodes SE2_1 to SE2_$m$ may be arranged to be spaced apart in the first direction DR1. The second sensing electrodes SE2_1 to SE1_$m$ may have the same electrode width in the first direction DR1. A separation distance between the second sensing electrodes SE2_1 to SE2_$m$ in the first direction DR1 may be constant.

The first sensing electrodes SE1_1 to SE1_$n$ and the second sensing electrodes SE2_1 to SE2_$m$ may cross each other. The first sensing electrodes SE1_1 to SE1_$n$ may be electrically insulated from each other, and the second sensing electrodes SE2_1 to SE2_$m$ may be electrically insulated from each other.

The input sensor ISP may operate in the first driving mode or in the second driving mode. In the first driving mode, the input sensor ISP obtains information about the first input TC1 through a change in mutual capacitance between the first sensing electrodes SE1_1 to SE1_$n$ and the second sensing electrodes SE2_1 to SE2_$m$. In the second driving mode, the input sensor ISP senses the second input TC2 by the input device AP through a change in capacitance of each of the first sensing electrodes SE1_1 to SE1_$n$ and the second sensing electrodes SE2_1 to SE2_$m$.

The input sensor ISP may further include a plurality of first signal lines SL1_1 to SL1_$n$ and a plurality of second signal lines SL2_1 to SL2_$m$. The first and second sensing electrodes SE1_1 to SE1_$n$ and SE2_1 to SE2_$m$ may be located in the sensing area SA. The first and second signal lines SL1_1 to SL1_$n$ and SL2_1 to SL2_$m$ may be located in the non-sensing area NSA. The plurality of first signal lines SL1_1 to SL1_$n$ are electrically connected to one sides of the first sensing electrodes SE1_1 to SE1_$n$, respectively, and the plurality of second signal lines SL2_1 to SL2_$m$ are electrically connected to one sides of the second sensing electrodes SE2_1 to SE2_$m$, respectively. According to some embodiments of the inventive concept, the input sensor ISP may further include third signal lines SL3_1 to SL3_$n$ electrically connected to the other sides of the first sensing electrodes SE1_1 to SE1_$n$, respectively. However, embodiments according to the inventive concept are not limited thereto. That is, the third signal lines SL3_1 to SL3_$n$ may be omitted.

The first sensing electrodes SE1_1 to SE1_$n$ are electrically connected to the sensor controller 100 through the plurality of first signal lines SL1_1 to SL1_$n$, and the second sensing electrodes SE2_1 to SE2_$m$ are electrically connected to the sensor controller 100 through the plurality of second signal lines SL2_1 to SL2_$m$.

Referring to FIGS. 3A, 5, and 6A, in a first driving mode MD1, the first sensing electrodes SE1_1 to SE1_$n$ may operate as a transmitting electrode, and the second sensing electrodes SE2_1 to SE2_$m$ may operate as a receiving electrode. In the first driving mode MD1, the sensor controller 100 may sense an external input by sensing an amount of change in mutual capacitance formed between the first sensing electrodes SE1_1 to SE1_$n$ and the second sensing electrodes SE2_1 to SE2_$m$.

In the first driving mode MD1, the sensor controller 100 may provide driving signals TS1 and TS2 to the first sensing electrodes SE1_1 to SE1_$n$. In the first driving mode MD1, the sensor controller 100 may receive sensing signals RS1 and RS2 from the second sensing electrodes SE2_1 to SE2_$m$. Accordingly, the sensor controller 100 may compare the driving signals TS1 and TS2 with the sensing signals RS1 and RS2 corresponding thereto and, on the basis of an amount of change thereof, may generate a coordinate value of a position to which the first input TC1 has been provided.

In the first driving mode MD1, the sensor controller 100 may provide the uplink signal ULS to the approach sensing electrode ASE. The sensor controller 100 may sense, in the first driving mode MD1, the approach of the input device AP through the approach sensing electrode ASE. That is, the sensor controller 100 may operate the input sensor ISP in the first driving mode MD1 and at the same time may sense the approach of the input device AP by using the approach sensing electrode ASE. Accordingly, the sensor controller 100 may simultaneously (or concurrently) sense the approach of the input device AP and the first input TC1. As a result, it may be possible to prevent the time for sensing the first input TC1 from being allocated to sensing of the approach of the input device AP, so that the performance of sensing the first input TC1 may be improved.

Referring to FIGS. 3A, 5, and 6B, when the input device AP is determined as being close to the display device DD, the input sensor ISP may enter a second driving mode MD2 for sensing the second input TC2. In the second driving mode MD2, the input device AP may transmit the downlink signal DLS to the sensor controller 100 through the input sensor ISP.

In the second driving mode MD2, the first sensing electrodes SE1_1 to SE1_$n$ and the second sensing electrodes SE2_1 to SE2_$m$ may be used as a receiving electrode for providing the sensor controller 100 with the downlink signal DLS provided from the input device AP.

In the second driving mode MD2, the sensor controller 100 may provide the uplink signal ULS to the approach sensing electrode ASE. While the input sensor ISP is operating in the second driving mode MD2, the sensor controller 100 may periodically sense the approach of the input device AP through the approach sensing electrode ASE. That is, while receiving the downlink signal through the input sensor ISP, the sensor controller 100 may periodically provide the uplink signal to the input device AP through the approach sensing electrode ASE. Accordingly, the sensor controller 100 may simultaneously (or concurrently) sense the approach of the input device AP and the second input TC2. As a result, it may be possible to prevent the time for sensing the second input TC2 from being allocated to sensing of the approach of the input device AP, so that the performance of sensing the second input TC2 may be improved.

Figure 7A:
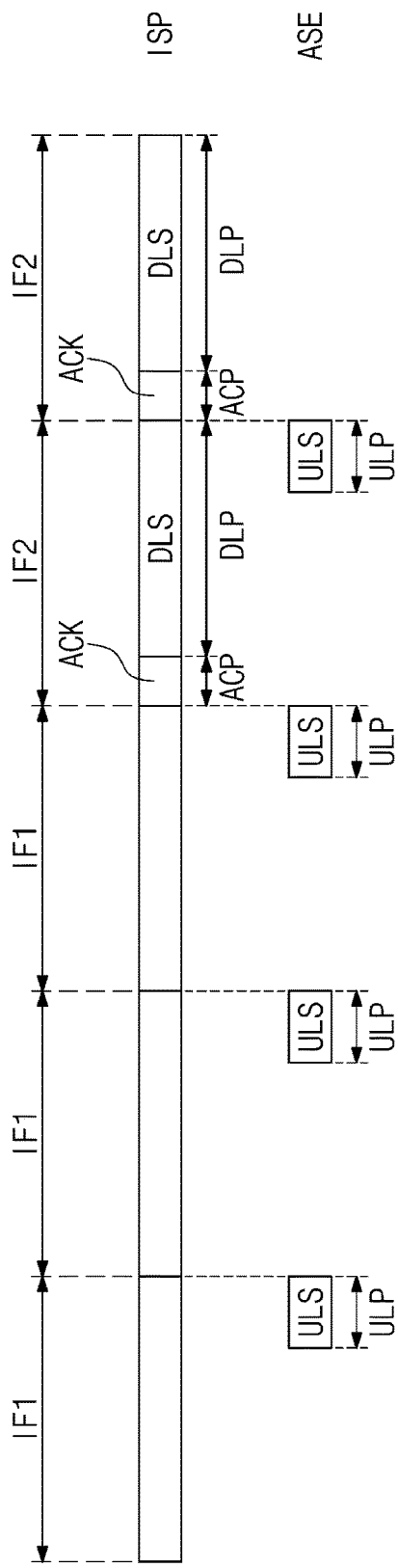
FIGS. 7A to 7C are each a conceptual diagram illustrating operations over time of an input sensor and an approach sensing electrode according to some embodiments of the inventive concept.
Figure 7B:
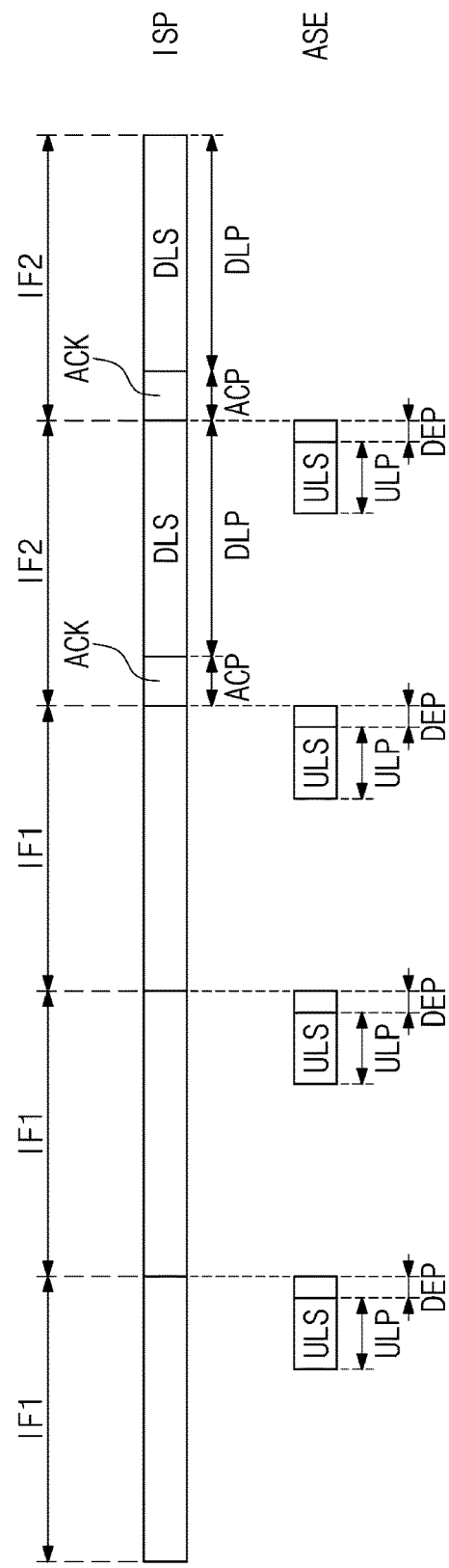
Figure 7C:
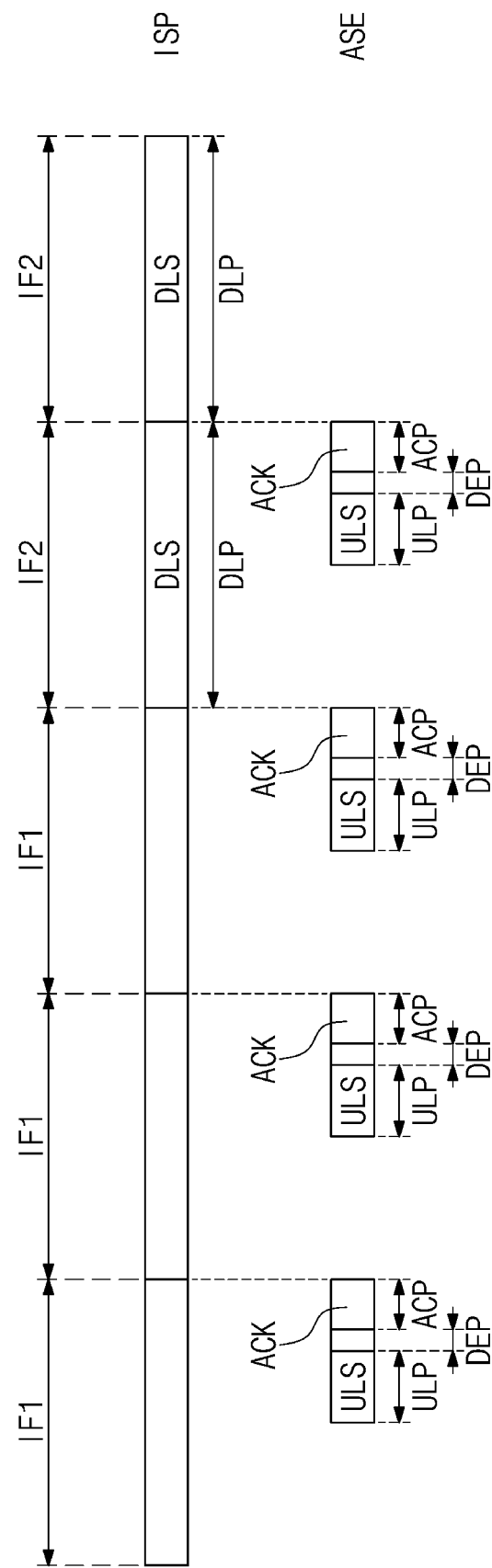

FIGS. 7A to 7C are each a conceptual diagram illustrating operations over time of an input sensor and an approach sensing electrode according to some embodiments of the inventive concept.

Referring to FIGS. 5 to 7A, the display device DD may sense the first input TC1 and the second input TC2 while displaying the image IM (illustrated in FIG. 1A) through the display panel DP (illustrated in FIG. 1B). The input sensor ISP may operate in the first driving mode MD1 for sensing the first input TC1 or in the second driving mode MD2 for sensing the second input TC2 depending on whether the input device AP is present or not. For example, the input sensor ISP may operate in the first driving mode MD1 when the input device AP is not sensed, and the input sensor ISP may operate in the second driving mode MD2 when the input device AP is sensed.

According to some embodiments of the inventive concept, in the first and second driving modes MD1 and MD2, an operating frequency of the input sensor ISP may be higher than or equal to an operating frequency of the display panel DP. For example, when the operating frequency of the display panel DP is about 120 Hz, the operating frequency of the input sensor ISP may be about 240 Hz. The operating frequency of the input sensor ISP in the first driving mode MD1 may be equal to the operating frequency of the input sensor ISP in the second driving mode MD2. The input sensor ISP senses the first input TC1 in the first driving mode MD1 during a first input sensing frame IF1 and senses the second input TC2 in the second driving mode MD2 during a second input sensing frame IF2. Here, the first input sensing frame IF1 may have the same period of time as the second input sensing frame IF2.

According to some embodiments of the inventive concept, when the input sensor ISP operates in the first driving mode MD1, the input sensor ISP may sense the first input TC1 in a first mode and in a second mode. Here, the first mode may be defined as a self-cap operation mode in which the first sensing electrodes SE1_1 to SE1_$n$ and the second sensing electrodes SE2_1 to SE2_$m$ of the input sensor ISP are integrated into one sensing electrode to sense the first input TC1. The second mode may be defined as a mutual-cap operation mode in which the first sensing electrodes SE1_1 to SE1_$n$ and the second sensing electrodes SE2_1 to SE2_$m$ of the input sensor ISP are capacitively coupled to sense the first input TC1. That is, in the first driving mode MD1, the first input sensing frame IF1 may include a first operation period for an operation in the first mode and a second operation period for an operation in the second mode. The input sensor ISP may sense the first input TC1 in the first mode during the first operation period and sense the first input TC1 in the second mode during the second operation period. According to some embodiments of the inventive concept, the second operation period may follow the first operation period in the first input sensing frame IF1. In addition, the period of time of the second operation period may be greater than the period of time of the first operation period.

When the input sensor ISP operates in the first driving mode MD1, the sensor controller 100 periodically transmits the uplink signal ULS to the input device AP through the approach sensing electrode ASE. Here, a period in which the approach sensing electrode ASE transmits the uplink signal ULS to the input device AP may be defined as an uplink period ULP. The uplink period ULP may overlap the first input sensing frame IF1. That is, the display device DD may sense the first input TC1 through the input sensor ISP and at the same time may sense the approach of the input device AP through the approach sensing electrode ASE. Accordingly, the input sensor ISP may not be used to sense the approach of the input device AP, and as a result, it may be possible to prevent a decrease in the period of time allocated for sensing the first input TC1.

The input sensor ISP may operate in the second driving mode MD2 during the second input sensing frame IF2. The second input sensing frame IF2 may include an acknowledgement period ACP and a downlink period DLP. The input device AP may transmit an acknowledgement signal ACK for the uplink signal ULS to the sensor controller 100 during the acknowledgement period ACP. In this case, the input sensor ISP may operate in the second driving mode MD2 and receive the acknowledgement signal ACK from the input device AP to transmit the acknowledgement signal ACK to the sensor controller 100.

When the sensor controller 100 receives the above-described acknowledgement signal ACK, the approach of the input device AP is confirmed, and the sensor controller 100 starts the downlink period DLP for communication with the input device AP. During the downlink period DLP, the input device AP transmits the downlink signal DLS to the sensor controller 100 through the input sensor ISP. The downlink signal DLS may include pen data, position information of the input device AP, slope of the input device AP, state information, and the like.

The second input sensing frame IF2 may include a pairing period in which the sensor controller 100 and the input device AP perform a pairing operation. During the pairing period, the sensor controller 100 and the input device AP may transmit and receive information with each other through the input sensor ISP.

Referring to FIG. 7B, a delay period DEP may be located between the uplink period ULP and a start time of the first input sensing frame IF1. After the uplink period ULP ends and then a delay by the delay period DEP occurs, a next first input sensing frame IF1 may start. Also, the delay period DEP may be located between the uplink period ULP and the second input sensing frame IF2. The delay period DEP may separate the acknowledgement period ACP of a next second input sensing frame IF2 and the uplink period ULP. The delay period DEP may be a pause period during which the sensor controller 100 and the input device AP do not transmit or receive signals. In addition, a delay period provided between the acknowledgement period ACP and the downlink period DLP may be further included in the second input sensing frame IF2.

Referring to FIG. 7C, the sensor controller 100 may periodically transmit the uplink signal ULS to the input device AP through the approach sensing electrode ASE and may receive the acknowledgement signal ACK from the input device AP through the approach sensing electrode ASE. Here, a period in which the approach sensing electrode ASE transmits the uplink signal ULS to the input device AP may be defined as the uplink period ULP, and a period in which the approach sensing electrode ASE receives the acknowledgement signal ACK from the input device AP may be defined as the acknowledgement period ACP.

The uplink period ULP and the acknowledgement period ACP may overlap a first input sensing frame IF1. That is, the display device DD may sense the first input TC1 through the input sensor ISP and at the same time may sense the approach of the input device AP through the approach sensing electrode ASE. Accordingly, the input sensor ISP may not be used to sense the approach of the input device AP, and as a result, it may be possible to prevent a decrease in a period of time allocated for sensing the first input TC1.

As illustrated in FIG. 7C, the delay period DEP may be further located between the uplink period ULP and the acknowledgement period ACP.

When the sensor controller 100 receives the above-described acknowledgement signal ACK, the approach of the input device AP is confirmed, and the sensor controller 100 starts the second input sensing frame IF2 for communication with the input device AP. The second input sensing frame IF2 includes the downlink period DLP. Compared with the second input sensing frame IF2 illustrated in FIG. 7A, the period of time of the downlink period DLP may increase in the second input sensing frame IF2 illustrated in FIG. 7C because the acknowledgement period ACP is omitted from the second input sensing frame IF2. Also, a delay period preceding the downlink period DLP may be further included in the second input sensing frame IF2.

Figure 8A:
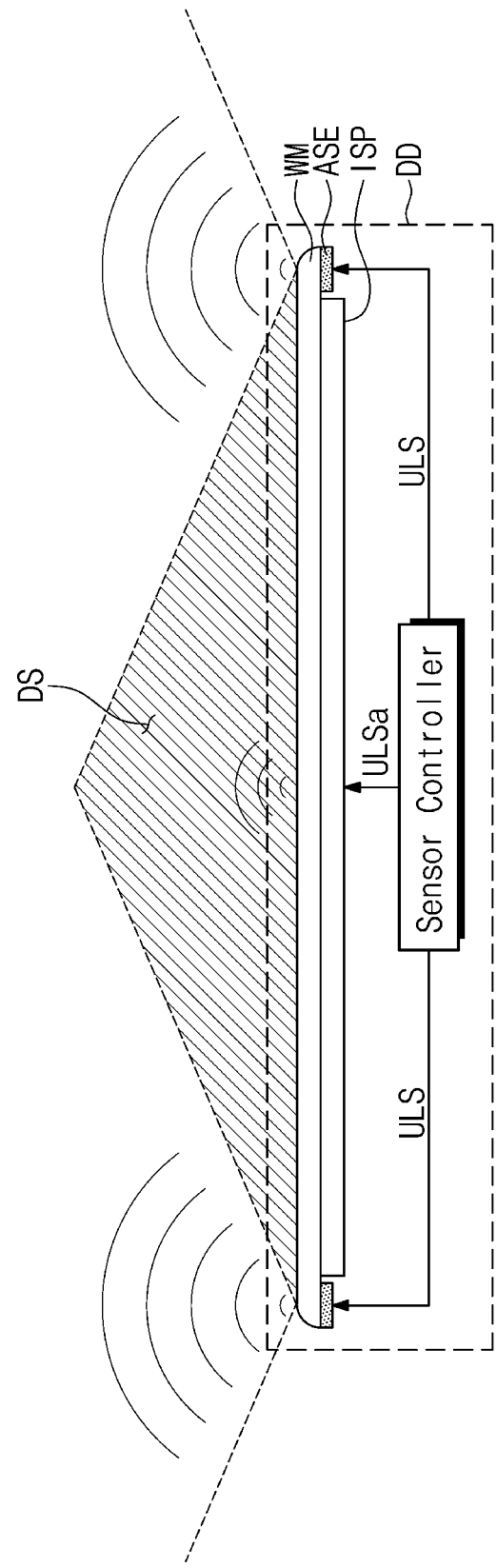
FIG. 8A is a block diagram for describing operations of an input sensor and a sensor controller according to some embodiments of the inventive concept.
Figure 8B:
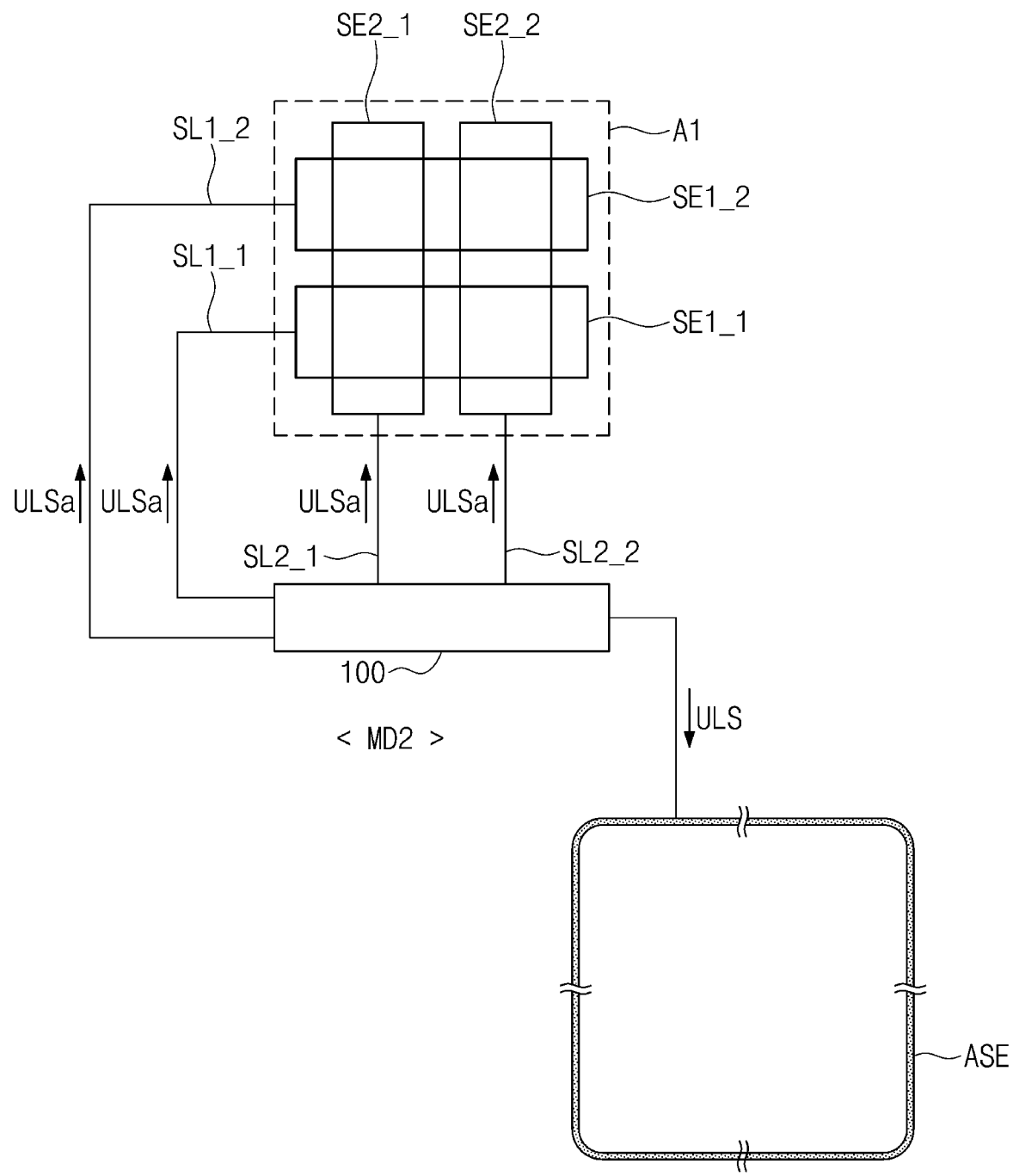
FIG. 8B is a view for describing operations of an input sensor and an approach sensing electrode in a second driving mode according to some embodiments of the inventive concept.

FIG. 8A is a block diagram for describing operations of an input sensor and a sensor controller according to some embodiments of the inventive concept. FIG. 8B is a view for describing operations of an input sensor and an approach sensing electrode in a second driving mode according to some embodiments of the inventive concept, and FIG. 8C is a conceptual diagram illustrating operations over time of an input sensor and an approach sensing electrode according to some embodiments of the inventive concept.

Referring to FIGS. 5, 8A and 8B, in the second driving mode MD2, the first sensing electrodes SE1_1 to SE1_$n$ and second sensing electrodes SE2_1 to SE2_$m$ may be used as a transmitting electrode to provide the input device AP with an auxiliary uplink signal ULSa provided from the sensor controller 100. Here, the auxiliary uplink signal ULSa transmitted to the input device AP through the first sensing electrodes SE1_1 to SE1_$n$ and the second sensing electrodes SE2_1 to SE2_$m$ may be distinguished from the uplink signal ULS transmitted to the input device AP through the approach sensing electrode ASE. The auxiliary uplink signal ULSa may have a lower voltage level than the uplink signal ULS. However, embodiments according to the inventive concept are not limited thereto. The auxiliary uplink signal ULSa may be the same signal as the uplink signal ULS.

The approach sensing electrode ASE is provided in the bezel area BZA (illustrated in FIG. 1B) of the display device DD (illustrated in FIG. 1B). There may be a dead space DS, above the input sensor ISP, in which the uplink signal ULS transmitted through the approach sensing electrode ASE is not provided or is weakly provided. The surface area of the dead space DS may increase as the display device DD gets bigger. When the input device AP is located within the dead space DS, it may be difficult for the input device AP to normally receive the uplink signal ULS transmitted through the approach sensing electrode ASE.

Thus, according to some embodiments of the inventive concept, the input sensor ISP may operate in the second driving mode MD2 so that the auxiliary uplink signal ULSa may be transmitted to the input device AP through the input sensor ISP. In particular, in order to transmit the auxiliary uplink signal ULSa to the input device AP, the first sensing electrodes SE1_1 to SE1_$n$ and the second sensing electrodes SE2_1 to SE2_$m$ of the input sensor ISP may be used as the transmitting electrode. That is, the first sensing electrodes SE1_1 to SE1_$n$ and the second sensing electrodes SE2_1 to SE2_$m$ of the input sensor ISP may receive the auxiliary uplink signal ULSa from the sensor controller 100 during an auxiliary uplink period ULPa. The auxiliary uplink period ULPa may be included in a second input sensing frame IF2.

The auxiliary uplink signal ULSa provided to the input sensor ISP may be a signal having a lower voltage level than the uplink signal ULS provided to the approach sensing electrode ASE. When the auxiliary uplink signal ULSa is transmitted to the input device AP through the input sensor ISP, a flicker may be viewed on a display panel DP arranged to overlap the input sensor ISP. According to some embodiments of the inventive concept, the auxiliary uplink signal ULSa may have a sufficiently low voltage level so that a flicker does not occur on the display panel DP. Accordingly, degradation of display quality of the display device DD may be prevented during an operation of sensing the approach of the input device AP in the auxiliary uplink period ULPa.

The sensor controller 100 may receive an auxiliary acknowledgement signal ACKa from the input device AP through the input sensor ISP. Here, the sensor controller 100 may receive the auxiliary acknowledgement signal ACKa as a response to the auxiliary uplink signal ULSa from the input device AP through the input sensor ISP, and a period in which the auxiliary acknowledgement signal ACKa is received may be defined as an auxiliary acknowledgement period ACPa.

According to FIG. 8C, the auxiliary uplink period ULPa and the auxiliary acknowledgement period ACPa may not overlap the uplink period ULP and the acknowledgement period ACP. However, embodiments according to the inventive concept are not limited thereto. For example, the auxiliary uplink period ULPa and the auxiliary acknowledgement period ACPa may respectively overlap the uplink period ULP and the acknowledgement period ACP. That is, the auxiliary uplink signal ULSa is transmitted to the input device AP through the input sensor ISP, and at the same time, the uplink signal ULS may be transmitted to the input device AP through the approach sensing electrode ASE. A delay period DEPa may be further located between the auxiliary uplink period ULPa and the auxiliary acknowledgement period ACPa.

As described above, by using the input sensor ISP to sense the approach of the input device AP in the second driving mode MD2, the performance of sensing the approach of the input device AP may be improved.

The display device according to some embodiments of the inventive concept may transmit the uplink signal for sensing the approach of the input device to the input device through the approach sensing electrode by including the approach sensing electrode that is driven independently of the input sensor. Accordingly, when the input sensor senses the first and second inputs in the first and second driving modes, respectively, the time allocated for sensing the approach of the input device may be omitted, and as a result, it may be possible to prevent performance of sensing the first and second inputs from being degraded due to lack of time.

Although the embodiments of the inventive concept have been described herein, it is understood that various changes and modifications can be made by those skilled in the art within the spirit and scope of the inventive concept defined by the following claims or the equivalents. Therefore, the embodiments described herein are not intended to limit the technical spirit and scope of the present invention, and all technical spirit within the scope of the following claims or the equivalents will be construed as being included in the scope of the present invention.

What is claimed is:

1. A display device comprising:
a display panel configured to display an image;
an input sensor on the display panel;
an approach sensing electrode arranged around the input sensor; and
a sensor controller connected to the input sensor and the approach sensing electrode,
wherein the sensor controller is configured to drive the input sensor in a first driving mode during a first input sensing frame and to drive the input sensor in a second driving mode during a second input sensing frame, and
the sensor controller is further configured to provide an uplink signal to the approach sensing electrode in response to the input sensor operating in the first or second driving mode,
wherein an uplink period in which the sensor controller transmits the uplink signal to an input device through the approach sensing electrode overlaps at least one of the first or second input sensing frame.

2. The display device of claim 1, further comprising a window on the input sensor and divided into a transmissive area and a bezel area,
wherein the approach sensing electrode is in the bezel area of the window.

3. The display device of claim 2, wherein the approach sensing electrode is on a rear surface of the window in correspondence with the bezel area.

4. The display device of claim 3, further comprising a cover layer on the rear surface of the window to cover the approach sensing electrode.

5. The display device of claim 4, wherein the approach sensing electrode comprises a metallic material, and the cover layer comprises an insulating material.

6. The display device of claim 5, wherein the cover layer further comprises a light blocking material.

7. The display device of claim 4, further comprising a contact flexible circuit film configured to connect the sensor controller and the approach sensing electrode,
wherein a contact portion exposing the approach sensing electrode is provided in the cover layer, and the contact flexible circuit film is connected to the approach sensing electrode through the contact portion.

8. The display device of claim 2, wherein the approach sensing electrode has a closed loop shape in the bezel area of the window.

9. The display device of claim 1, wherein the input sensor comprises:
a plurality of first sensing electrodes; and
a plurality of second sensing electrodes electrically insulated from the first sensing electrodes.

10. The display device of claim 9, wherein
in the first driving mode, the first sensing electrodes are configured to be used as a transmitting electrode, and the second sensing electrodes are configured to be used as a receiving electrode, and
in the second driving mode, both the first sensing electrodes and the second sensing electrodes are configured to be used as a transmitting electrode or as a receiving electrode.

11. The display device of claim 1, wherein the second input sensing frame in which the input sensor operates in the second driving mode comprises a downlink period in which the sensor controller receives a downlink signal from the input device through the input sensor.

12. The display device of claim 1, wherein the second input sensing frame further comprises an auxiliary uplink period in which the sensor controller transmits an auxiliary uplink signal to the input device through the input sensor.

13. The display device of claim 12, wherein the auxiliary uplink signal has a voltage level different from a voltage level of the uplink signal.

14. The display device of claim 11, wherein
the first driving mode is a mode in which a first input generated by a user's body is sensed, and
the second driving mode is a mode in which a second input generated by the input device is sensed.

15. The display device of claim 14, wherein the input device is an active pen.

16. A display device comprising:
a display panel configured to display an image;
an input sensor on the display panel;
a window on the input sensor;
an approach sensing electrode directly on a rear surface of the window to sense approach of an input device; and a sensor controller connected to the input sensor and the approach sensing electrode, wherein the sensor controller is configured to drive the input sensor in a first driving mode during a first input sensing frame and to drive the input sensor in a second driving mode during a second input sensing frame, and the sensor controller is configured to provide an uplink signal to the approach sensing electrode in response to the input sensor operating in the first or second driving mode.

17. The display device of claim 16, wherein the input sensor comprises:

a plurality of first sensing electrodes; and a plurality of second sensing electrodes electrically insulated from the first sensing electrodes.

18. The display device of claim 17, wherein the approach sensing electrode does not overlap the first and second sensing electrodes.

19. The display device of claim 16, wherein the second input sensing frame in which the input sensor operates in the second driving mode comprises a downlink period in which the sensor controller receives a downlink signal from the input device through the input sensor, and an uplink period in which the sensor controller transmits the uplink signal to the input device through the approach sensing electrode overlaps at least one of the first or second input sensing frame.

* * * * *